(12) United States Patent
Tabanelli et al.

(10) Patent No.: US 8,512,027 B2
(45) Date of Patent: Aug. 20, 2013

(54) BELLING MACHINE FOR PIPES MADE OF THERMOPLASTIC MATERIAL, FORMING END SOCKETS EQUIPPED WITH AN INTEGRATED SEAL

(75) Inventors: Giorgio Tabanelli, Cotignola (IT); Patrik Altini, Fornace Zarattini (IT)

(73) Assignee: Sica S.p.A., Alfonsine (IT)

( * ) Notice: Subject to any disclaimer, the term of this patent is extended or adjusted under 35 U.S.C. 154(b) by 164 days.

(21) Appl. No.: 13/047,995

(22) Filed: Mar. 15, 2011

(65) Prior Publication Data

US 2011/0236520 A1    Sep. 29, 2011

(30) Foreign Application Priority Data

Mar. 25, 2010  (EP) ..................................... 10425090

(51) Int. Cl.
*B29C 57/04*    (2006.01)
(52) U.S. Cl.
USPC ............. 425/393; 425/403; 249/89; 249/100; 264/249; 264/318; 29/451
(58) Field of Classification Search
USPC ................. 425/185, 186, 392, 393, 383, 384, 425/403, 466–468, DIG. 218, DIG. 47; 264/249, 318, 322; 29/450–451; 249/87–89, 249/99, 100
See application file for complete search history.

(56) References Cited

U.S. PATENT DOCUMENTS

| | | | | |
|---|---|---|---|---|
| 1,690,992 A | * | 11/1928 | Orr | 164/112 |
| 3,360,826 A | * | 1/1968 | Lorang | 425/392 |
| 3,520,047 A | * | 7/1970 | Jirka et al. | 29/423 |
| 3,553,780 A | * | 1/1971 | Kuhlemann | 425/384 |
| 3,806,301 A | * | 4/1974 | Osterhagen et al. | 425/393 |
| 3,851,369 A | | 12/1974 | Eschholz | |
| 3,960,472 A | * | 6/1976 | O'Connor et al. | 425/393 |
| 4,030,872 A | | 6/1977 | Parmann | |
| 4,204,823 A | | 5/1980 | Hayes et al. | |
| 4,206,538 A | * | 6/1980 | Hayes et al. | 29/450 |
| 4,234,301 A | * | 11/1980 | Hayes et al. | 425/392 |
| 4,277,231 A | * | 7/1981 | Gordon | 425/387.1 |

(Continued)

FOREIGN PATENT DOCUMENTS

| | | |
|---|---|---|
| EP | 0 516 595 B1 | 12/1992 |
| EP | 571175 A2 * | 11/1993 |

(Continued)

*Primary Examiner* — Dimple Bodawala
(74) *Attorney, Agent, or Firm* — Pearne & Gordon LLP

(57) ABSTRACT

A belling machine (1) forms end sockets equipped with an integrated seal on pipes (3) made of thermoplastic material using a forming mandrel (4) on which an annular seal (5) was previously placed, diametrically expanded, coaxially and in a predetermined position. A loader (8) for loading the annular seal (5) on the mandrel (4) is able to move between a arming position, in which the loader is spaced from the belling axis (b) and does not interfere with the mandrel (4) movement along the belling axis (b), and a loading position, in which the loader is coaxial with the belling axis (b) and is located between the mandrel (4) back position, disengaged from the pipe (3) and the mandrel (4) forward position, inserted in the end (30) of the pipe (3). An annular seal (5) is placed in a positioner (10) which holds it in an operating position for the action of an arming device (9). After the seal (5) has been picked up from the positioner (10), the arming device (9) armes the loader (8) with the annular seal (5) when the loader (8) is in the arming position.

16 Claims, 18 Drawing Sheets

(56) References Cited

U.S. PATENT DOCUMENTS

| | | | |
|---|---|---|---|
| 4,395,379 A * | 7/1983 | Herder et al. | 264/573 |
| 4,403,938 A * | 9/1983 | Seach et al. | 425/393 |
| 4,430,052 A * | 2/1984 | Olsson | 425/392 |
| 4,457,886 A * | 7/1984 | Acda et al. | 264/249 |
| 4,545,951 A * | 10/1985 | Gordon | 264/322 |
| 4,723,905 A * | 2/1988 | Vassallo et al. | 425/392 |
| 4,832,555 A | 5/1989 | Gordon | |
| 4,975,234 A * | 12/1990 | Parmann | 264/249 |
| 5,863,569 A * | 1/1999 | Leopoldo et al. | 425/387.1 |
| 6,536,239 B1 * | 3/2003 | Mueller et al. | 65/292 |
| 8,211,347 B2 * | 7/2012 | Tabanelli | 264/296 |

FOREIGN PATENT DOCUMENTS

| | | |
|---|---|---|
| EP | 0 684 124 B1 | 11/1995 |
| EP | 1792704 A1 * | 6/2007 |
| EP | 2189268 A1 * | 5/2010 |
| JP | 04080010 A * | 3/1992 |
| JP | 0919960 F1 * | 1/1997 |

* cited by examiner

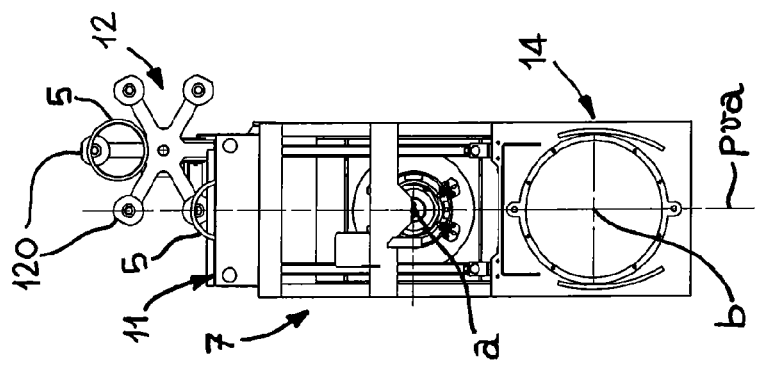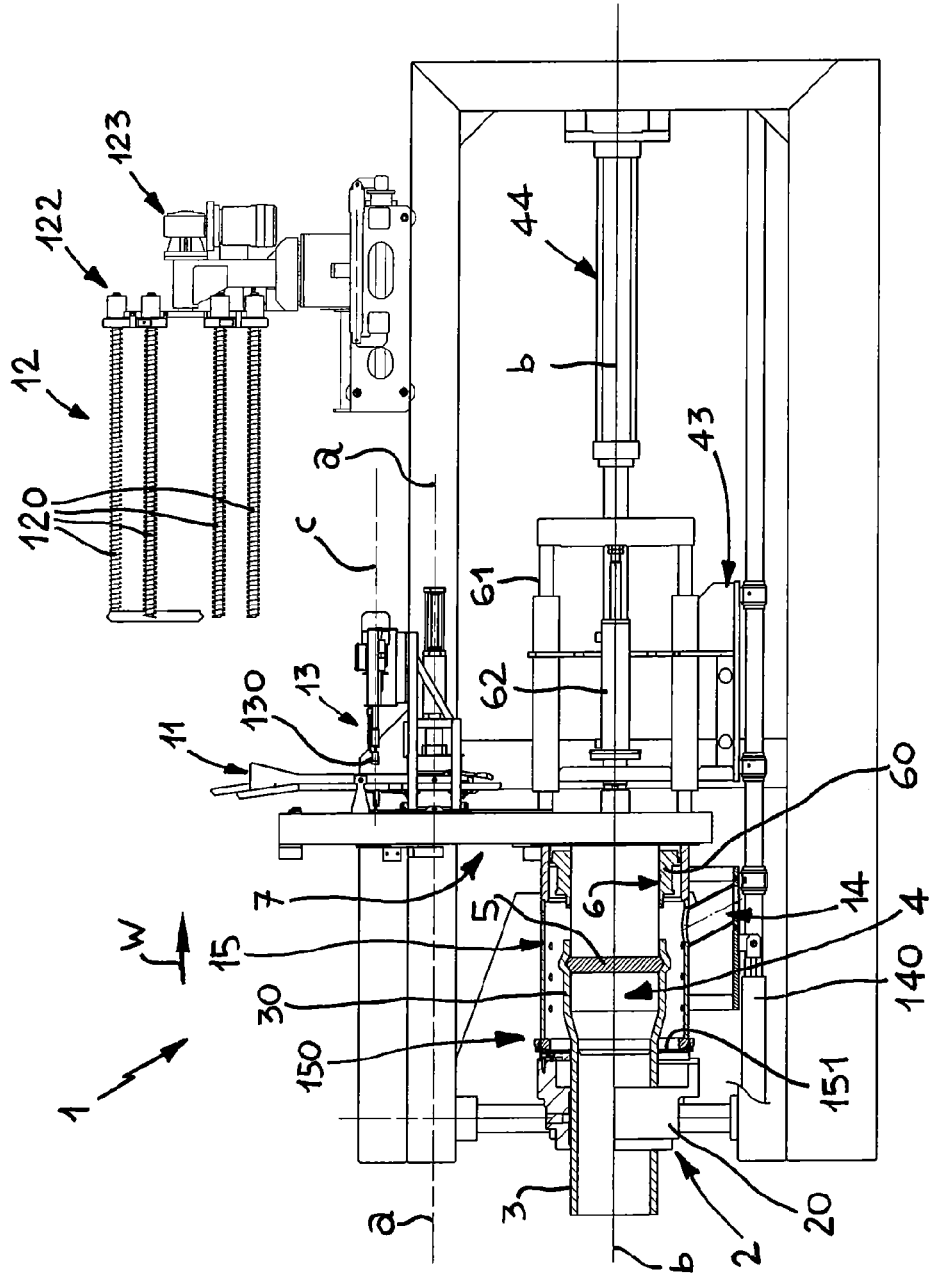

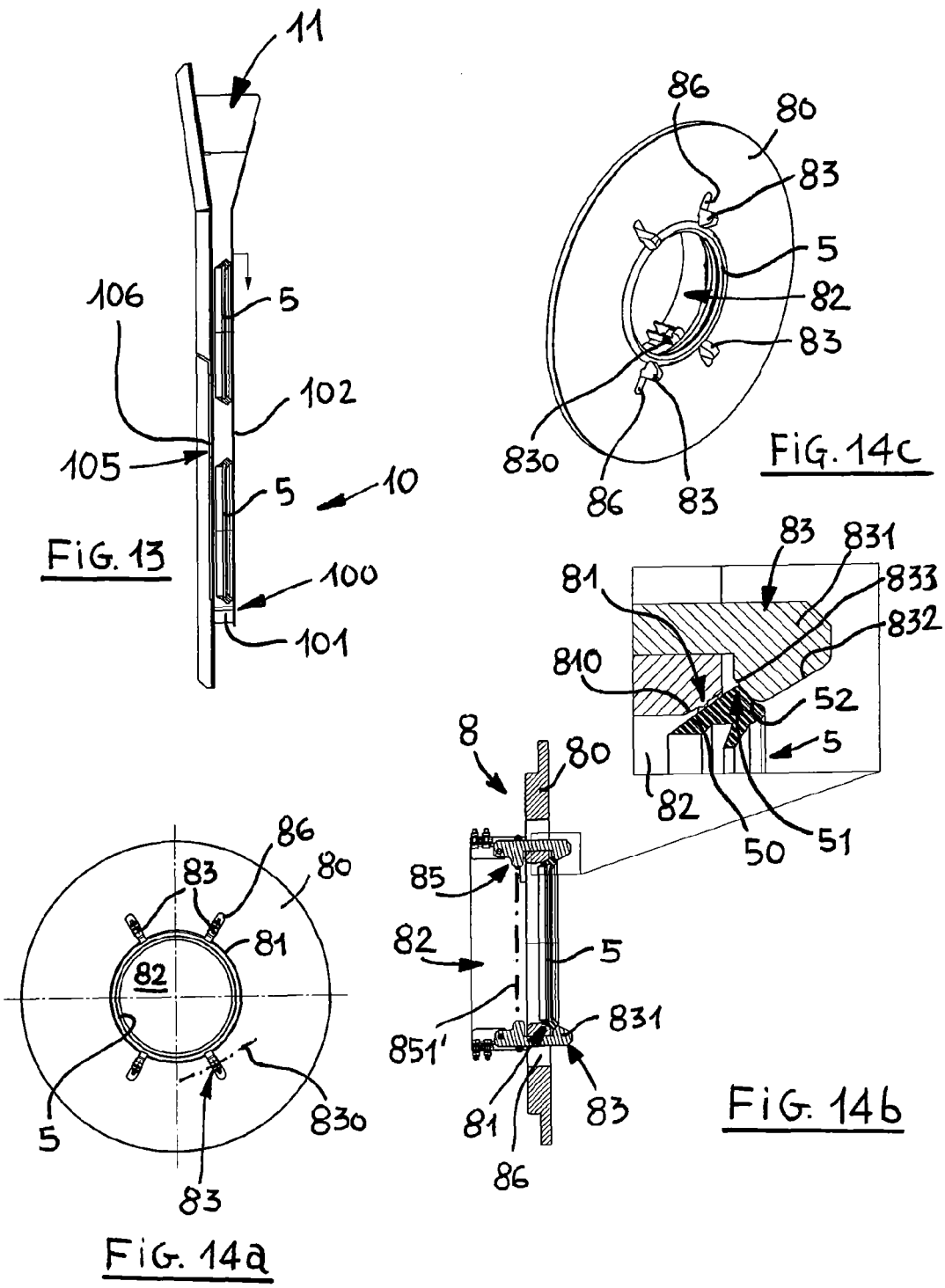

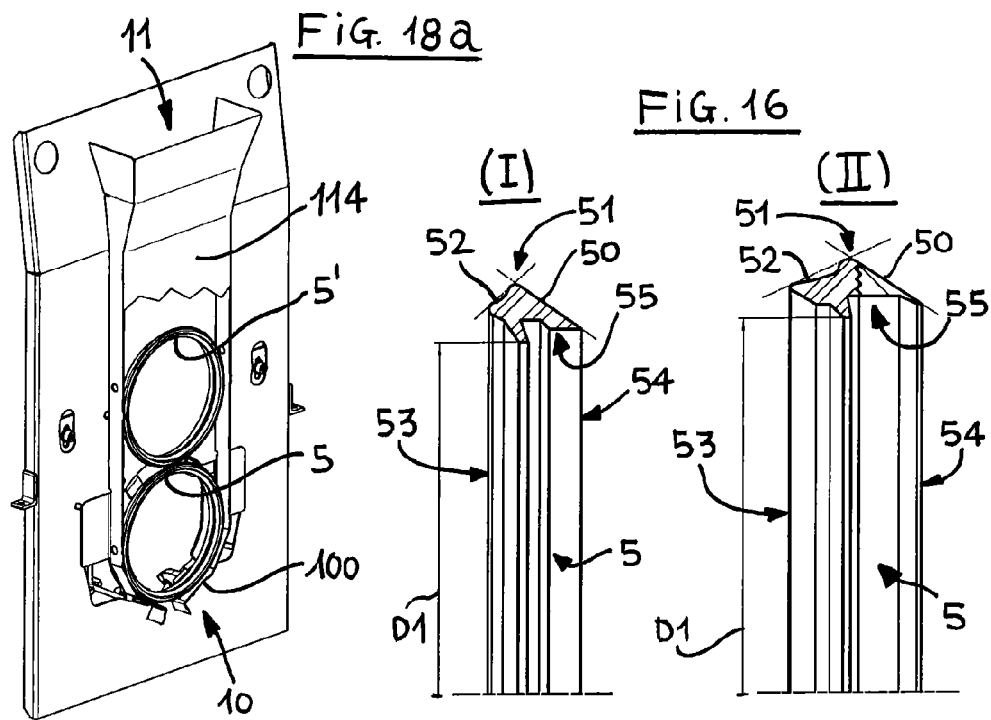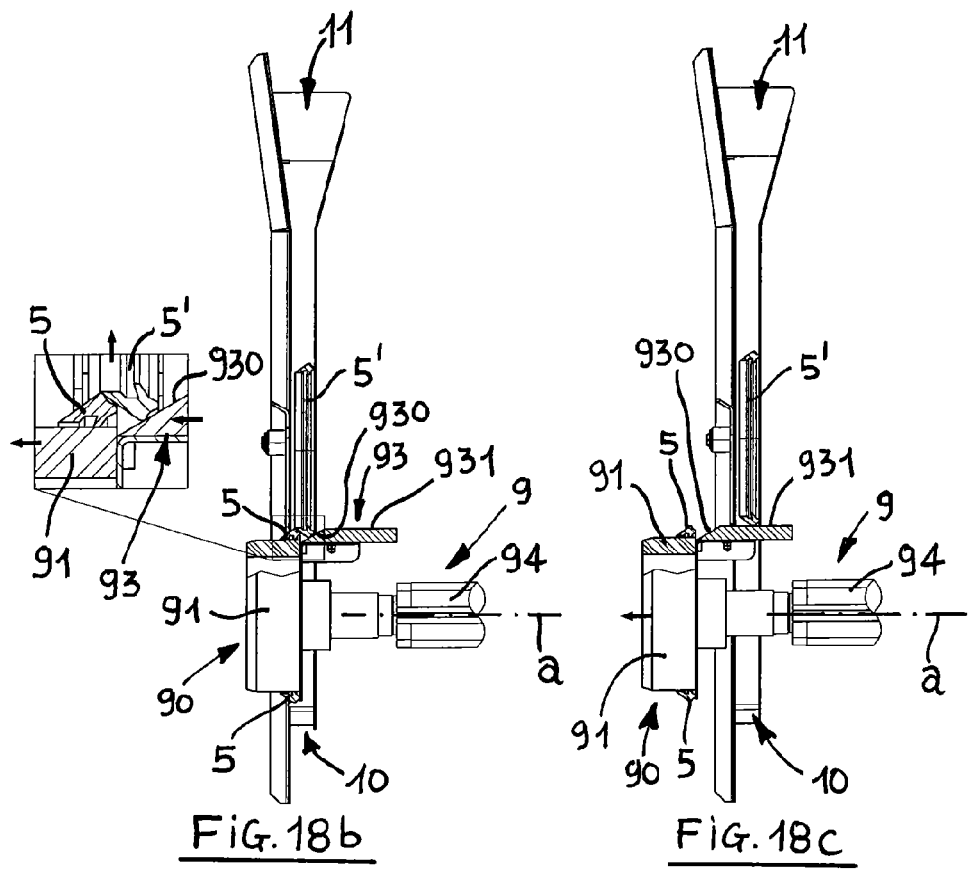

BELLING MACHINE FOR PIPES MADE OF THERMOPLASTIC MATERIAL, FORMING END SOCKETS EQUIPPED WITH AN INTEGRATED SEAL

FIELD OF THE INVENTION

This invention relates to a belling machine for pipes made of thermoplastic material, forming end sockets equipped with an integrated seal.

BACKGROUND OF THE INVENTION

In the production of pipes made of thermoplastic material intended for making fluid feed and/or drainage ducts (for example used in construction, in sewer systems, drinking water distribution networks, in drains) belling machines are used to form an end portion of the pipes into the characteristic "socket" shape, which is enlarged compared with the normal diameter of the pipe (the "connecting socket") and is used to connect the pipes to each other one after another to form the duct. In general, an unformed end of a pipe is inserted in the socket end of the pipe which comes before or after it in the duct.

The belling machine, usually automatic, may be installed in an extrusion line and, in the line, receives the pipes/cut pieces of pipe to be processed.

Most belling machines make the socket with the thermoforming process. Belling machines are equipped with at least one oven for heating the end of the pipe to be formed and a forming apparatus which uses a suitable mould to form the heated end of the pipe into a socket. The socket formed on the mould is normally cooled in the forming apparatus. In the enlarged shape of common sockets, intended for connecting to another pipe, there is usually a seal groove for receiving an elastomeric seal which guarantees that the joint is sealed against leakage of fluids from the duct.

There is widespread use of the forming of the end of the pipe using a mandrel mould, also called a plug (in particular if using PVC-U pipes, or rigid polyvinyl chloride, not plasticised). The mandrel, or plug, reproduces the inner shape of the socket to be formed. To form the end of the pipe into a socket, the plug is inserted in the pipe at the end to be formed. The shape of the seal groove is usually obtained, once the mandrel has been inserted in the hot end of the pipe, by making expandable mechanical inserts come out of the surface of the mandrel. The inserts press on the inside of the pipe, forming the groove for the seal. Pipe forming is normally carried out and/or completed by acting on the end of the pipe fitted on the mandrel (when the mechanical inserts are expanded, if the seal groove is to be formed) with a fluidic action applied either by compressed air (or another suitable fluid) acting on the outside of the pipe, or by sucking with a vacuum from the inside of the mandrel. In general, fluidic action of air (or another suitable fluid) acting on the outside of the pipe is used. The wall of the pipe is formed against the mandrel. Once the socket has been formed and cooled, the mechanical inserts are retracted below the internal diameter of the socket, allowing extraction of the mandrel (or plug) from the socket.

The forming technique using a mechanical plug and pressurised fluid acting from the outside is widely used. Socket forming systems of this type are described, for example, in patent documents EP 0 684 124 and EP 0 516 595. In all of the systems with which a seal groove is made in the socket for the O-ring, after the socket has been formed, the seal must be inserted in the seal groove. It is inserted either manually or with the aid of tools. In particular in production lines for pipes intended for drains in buildings, machines are used which automatically insert the seal in the socket formed. In the production line these automatic seal inserters are usually located downstream of the automatic belling machine and they normally receive the pipe on which the socket has been formed directly from the belling machine.

There are special prior art automatic belling machines (often used in production lines for PVC-U pipes) which form an end socket with the seal already integrated in it. Such belling machines form the socket using a system commonly known in technical literature as the "Rieber system".

In the Rieber system, a metal mandrel, on which the seal was previously placed in a precise position, is fitted at the heated end of the pipe. Consequently, the end of the pipe fits onto the metal mandrel and the seal. In practice, the mandrel and the seal together form the socket forming mould. Once the heated end of the pipe to be formed has been fitted on the assembly consisting of the mandrel and the seal positioned on the mandrel, the end of the pipe is definitively formed on the mandrel (and on the seal) by applying a vacuum (tending to create a vacuum inside the pipe fitted on the mandrel) and/or an overpressure on the outer surface of the pipe (for example with a pressurised fluid such as, in particular, compressed air). When cooling is complete, the seal remains locked in the socket, becoming an integral part of it.

The seals used in the Rieber system are different to the elastomeric seals normally intended for insertion in the seal groove of a socket after the socket has been formed and cooled. In particular, they are characterised by a structure which includes in the elastomeric material an annular part—made of metal or hard plastic—with specific seal strengthening and stiffening functions.

Therefore, the Rieber system allows a single machine to make a pipe whose end has a socket formed on it complete with a seal, the seal being locked in the pipe socket end. This avoids the need to manually insert seals in their grooves when installing the duct, and avoids having to equip the production line with the equipment necessary for inserting the seals in the respective grooves after the sockets have been formed. Therefore, the operating and logistical advantages of the Rieber system are obvious both during production and during duct installation.

However, one disadvantage of the Rieber system is the fact that any damage to the seal during socket forming, or incorrect positioning of the seal in the socket, results in the whole pipe having to be rejected, since the seal cannot be substituted in the pipe made using the Rieber system.

Compared with conventional belling systems (in which the seal is inserted in the socket after the socket has been formed and cooled), the Rieber system has the added disadvantage of requiring that a seal be loaded on the plug before the mandrel (or plug) is inserted in the heated end of the pipe. This is a disadvantage of the Rieber system compared with normal belling systems using a mechanical plug which form the socket with the seal groove but without inserting the seal in it. From the mechanical viewpoint, although the mandrel usable in the Rieber system is generally simpler than those which form the seal groove using expandable mechanical inserts (which are more complex and expensive), the Rieber belling system requires the presence, in the belling machine, of additional auxiliary devices, necessary for loading the seal on the mandrel (or plug). These additional devices are absent in conventional systems. From the point of view of production times, the step of loading the seal on the mandrel is carried out by means of a set of operations which require an execution time which affects the overall duration of the socket forming and cooling cycle.

Moreover, in the Rieber system the operations for loading the seal on the mandrel must guarantee a high level of reliability, so that the seal is actually and correctly positioned on the mandrel. The reliability of the loading process tends to be reduced with increases in the speed of the individual operations linked to the loading process. Greater speed in the loading operations causes a substantial increase in the complexity of the process control methods and an increase in the inertial forces (and the problems linked to them in terms of control and precision). It also accentuates impacts between parts which make contact with each other.

Significant examples of application of the Rieber system and of belling machines operating on the basis of that system are described in patent documents U.S. Pat. Nos. 4,030,872, 4,975,234, 4,204,823, 4,723,905.

In particular, document U.S. Pat. No. 4,030,872 describes a belling method in which a seal, having the features of those used in the Rieber system, is manually placed on the mandrel and held in position there during mandrel insertion in the end of the pipe by elements which can expand radially outwards from inside the mandrel. Said expandable elements are inserted in an annular cavity made on the inner surface of the seal where that inner surface makes contact with the surface of the mandrel and they hold the seal in position on the mandrel when the pipe is fitted onto it. Forming is completed by applying the vacuum inside the mandrel in the zone where the seal is positioned. Seal positioning on the mandrel before belling is not automated.

Document U.S. Pat. No. 4,975,234 describes a belling machine operating with a "Rieber" type system, in which a rigid cradle, open at the top, is connected to an actuator which moves it vertically from a lowered position, in which it does not interfere with the horizontal trajectory followed by the mandrel for its insertion in the end of the pipe, to a raised position in which it is positioned on said trajectory between the mandrel and the pipe. In the raised position, the cradle receives an annular seal, dropped onto it by a feed hopper into which the seal drops from a collection magazine. When the seal is in the cradle, the mandrel advances, enters the cradle and is inserted in the seal. The rigid cradle acts as an opposing element which holds the seal, allowing the mandrel to forcibly slide into the seal and diametrically expand it. While the mandrel begins entering the end of the pipe, the cradle is lowered. A contact flange coaxial with the mandrel advances, makes contact with the rear of the seal and puts it in position, holding it while the mandrel penetrates the pipe. Once the pipe has been fitted on the mandrel and the seal (and on part of the contact flange), the flange moves back and forming is completed. The mandrel is removed from the pipe, in which the seal remains, and the process can begin again.

In this system, the configuration of the seal collection cradle, which also acts as a rigid opposing element during loading on the mandrel, creates problems for centring the seal on the mandrel and makes free expansion of the seal difficult during the passage from the tapered leading portion of the mandrel to the cylindrical portion of the latter. These problems make it difficult to use this solution in rapid belling processes. Moreover, the position of the cradle and its movement make the solution incompatible with the processing of pipes having a medium—large diameter (greater than 630 mm), unless the belling machine (and in particular the forming mandrel) operates at heights above the ground that are much greater than the normal operating heights of pipe extrusion lines.

Document U.S. Pat. No. 4,204,823 describes a variant of the previous solution, in which the collection cradle, open at the top for receiving the seals dropped from the feed magazine, is made in two parts which, when the mandrel has loaded the seal using the cradle as a rigid opposing element, separate from each other in a horizontal direction, moving away from the axis along which the mandrel moves, by the action of a complex mechanism of levers and guides connected to the mandrel movement, thus allowing the mandrel to pass freely until it is inserted in the end of the pipe. The mandrel return to its initial position, after belling, causes the two parts of the cradle to close on each other again, so that the cycle can be started again. Although modifying the movement of the parts of the cradle, allowing the movement to be horizontal, the solution proposed is mechanically complex and does not solve the problem of centring the seal on the mandrel and the difficulty in seal free expansion during the passage from the tapered leading portion of the mandrel to its cylindrical portion. As already indicated, these problems make it difficult to use this solution in rapid belling processes.

Document U.S. Pat. No. 4,723,905 describes several variants of "Rieber" type seals and several devices for holding them in position on the mandrel while the mandrel, with the seal already in position, is forcibly inserted into the end of the pipe.

The problems encountered in all of the belling systems which can be traced back to the Rieber system which, to the Applicant's knowledge, have so far been made, make it practically impossible to adapt said system to conventional belling machines which have a high production capacity, due to the imprecise seal positioning (and, therefore, the high probability of error when the machine is made to operate rapidly) and/or due to the complications in the mechanisms (with the consequent difficulty integrating their operation into the overall operating cycle of the belling machine).

Of conventional belling machines ("non-Rieber" machines) where it might be worthwhile to integrate a "Rieber" type system, if it were rendered reliable and versatile enough for its operation to be able to integrate in the machine operating cycle without reducing its efficiency, the type of belling machine described in the above-mentioned patent document EP 0 684 124, in the name of the same Applicant as the present, should be included. That document describes the configuration of an automatic belling machine of significant interest for optimising the production process, as well as being suitable for processing short pipes (up to 0.5 m, to which the length of the socket is added). It typically comprises various stations to which the pipe is transported so that the various processing steps can be performed.

The first station receives the pipe cut along the extrusion line. In this station, a special positioner device moves the pipe longitudinally and detaches it from the pipe which comes after it, then stops the pipe in a precise position still aligned with the axis of extrusion.

From this station the pipe is then moved only transversally to other process stations and then, when the socket has been formed, the pipe is unloaded from the machine. The pipe is positioned in sequence in two heating stations and a forming station which are located alongside each other. When the pipe is positioned in the first heating station, the latter's oven, from the initial back position, advances towards the pipe until it encloses the end of the pipe to be heated. At the end of the first heating process, the oven moves back and the pipe released is moved transversally and positioned in front of the second heating station, in which the same movements as in the first heating station are performed.

When the heating process has ended, with the second oven in the back position, the pipe is positioned at the forming station, then clamped and locked by clamps, before the forming mandrel advances and penetrates the pipe. A forming chamber advances towards the pipe together with the mandrel. The chamber ends its stroke by resting against a contact structure applied to the pipe locking clamps. In this way, the chamber encloses the end of the pipe on which a socket is to be formed and creates a hermetic seal which allows chamber pressurisation with compressed air. The pressing action of the compressed air on the outer surface of the pipe presses and forms into a socket the wall of the end of the pipe against the plug. The plug precisely forms the inner shape of the socket. When socket forming and cooling are complete, the forming chamber moves back, the plug with the mechanical inserts retracted is extracted from the socket and the clamp opens. At this point the pipe is moved transversally so that it can be unloaded from the belling machine. The machine production rate is equal to the longest time for which the pipe remains in each station. Obviously, the system is optimised at the lowest production time when the times for which the pipe remains in the individual stations, including the time for movement from the previous station, are equal. The transversal dimension of the belling machine will be bigger the more operating stations there are (since these are positioned alongside each other). However, to make the machine faster, that is to say, to reduce the cycle time, it is convenient to split the heating and socket forming—cooling process over many stations, so that the time for which the pipe remains in each station is also split. For example, a time of 200 seconds for heating the end of the pipe so that it reaches the thermal state suitable for socket thermoforming, becomes a heating cycle time in a station equal to 100 seconds, if the heating is split over two ovens. Similarly, to reduce the cycle times, multi-belling solutions may be adopted: after the positioning station, the pipes may be gathered in groups each consisting of two or more pipes which are simultaneously moved and processed in the heating and socket forming—cooling stations. Owing to the size and complexity of the heating devices and forming moulds, this solution is only used for processing small diameter pipes, normally having diameters not greater than 160 mm.

The most complex and expensive part of the machine is the socket forming and cooling station. Socket forming and cooling stations which are split or configured for multi-belling would produce complex and heavy machines. Therefore, for the forming station the use of process and construction solutions which minimise process times for socket forming and cooling with reduced size is decisive.

This invention has for an aim to overcome the above-mentioned disadvantages, by providing a belling machine for pipes made of thermoplastic material, forming end sockets equipped with an integrated seal which makes seal loading on the forming mandrel precise, minimising the risk of errors.

Another aim of the invention is to provide a belling machine for pipes made of thermoplastic material, forming end sockets equipped with an integrated seal which allows high production rates with reduced margins of error.

SUMMARY OF THE INVENTION

According to this invention, these aims and others, more apparent in the description below, are achieved in a belling machine for pipes made of thermoplastic material, forming end sockets equipped with an integrated seal, having the structural and functional features described in the appended independent claim, the appended dependent claims describing alternative embodiments.

BRIEF DESCRIPTION OF THE DRAWINGS

The invention is described in more detail below, with reference to the accompanying drawings, which illustrate a preferred, non-limiting embodiment of the invention, and in which:

FIG. 1 is a side view, partly in cross-section and with some parts cut away to better illustrate others, of a belling machine according to the invention, in the configuration adopted when the socket is formed and cooled;

FIG. 1a is a front view in the observation direction labelled W in FIG. 1, of a detail of the machine (with some parts cut away), showing the flange for fixing the loading apparatus structure to the mobile forming chamber;

FIG. 3a illustrates a detail of FIG. 3 seen from the left of the page, showing the step of unloading a pipe on which an end socket has been formed, loading a new pipe and heating a third pipe;

FIG. 13 is a lateral longitudinal section of the positioner integrated with the hopper, with some parts cut away for greater clarity and showing a flap in the closed position;

FIGS. 14a to 14c illustrate a detail of the loader with a seal inserted and showing the action of the gripper elements on the seal;

FIG. 16 illustrates (in cross-section in an axial plane, the missing half of the structures being symmetrical relative to the axis of that illustrated) two alternative embodiments (details I and II) of types of seals commonly used in the sector, showing the features shared by all seals (in particular those of the "Rieber" type);

FIG. 18a illustrates the positioner of FIG. 11 in a condition in which resting above a correctly positioned seal there is a second seal which accidentally dropped into the feed hopper from the seal magazine;

FIGS. 18b, 18c and 18d (in particular the detail in the box in FIG. 18b) illustrate the action of the upper projection of the arming device pusher to avoid drawing both seals towards the loader;

DETAILED DESCRIPTION OF THE INVENTION

Figure 2:
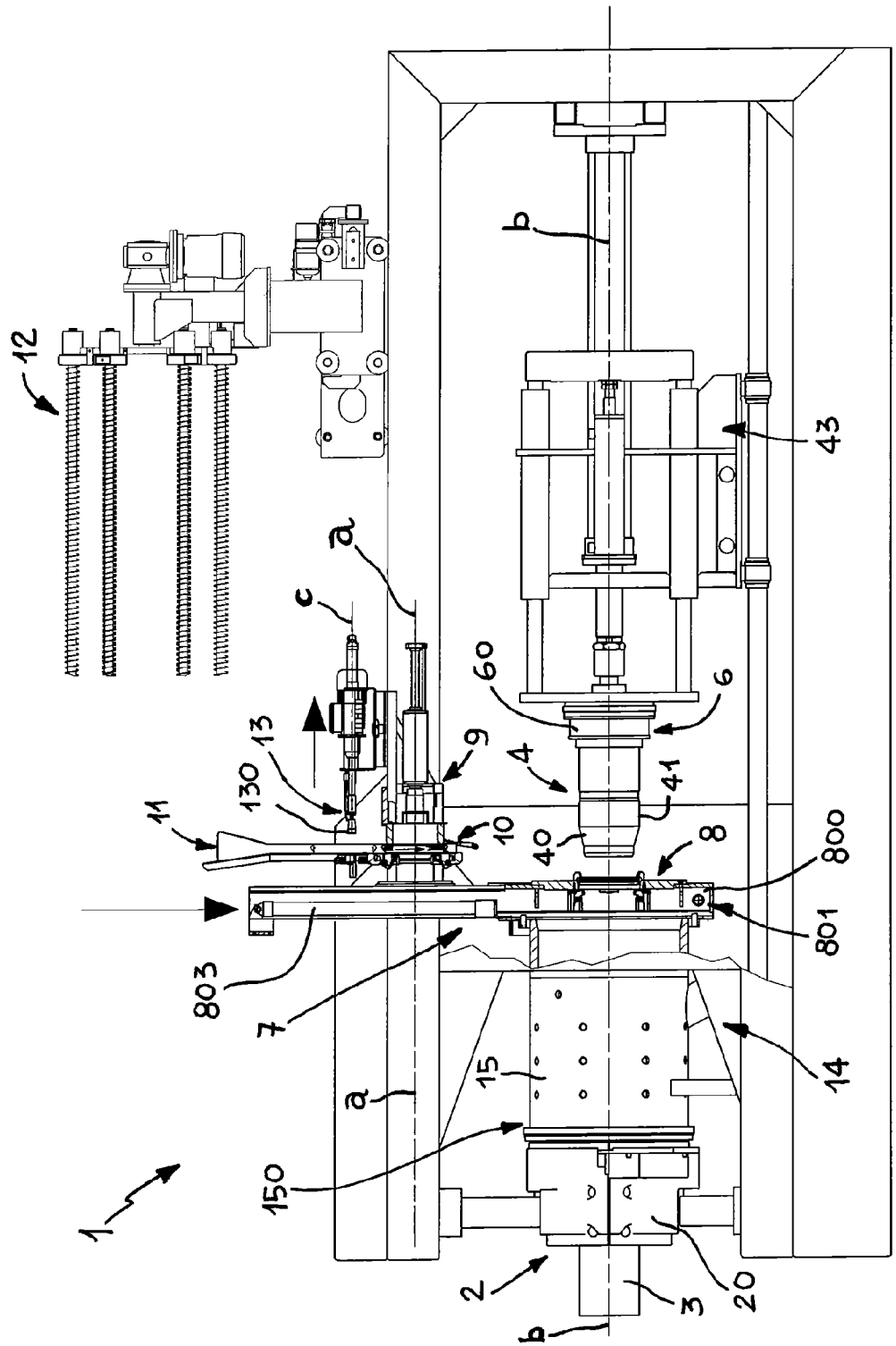
FIG. 2 illustrates the machine of FIG. 1, with some parts interrupted and in cross-section, in a configuration in which: the mandrel is in the back position, the loader is in the loading position already provided with a seal to be fitted on the mandrel (with the forming chamber in contact against the pipe locking clamps and the lubricating wheel back)

With reference to the accompanying drawings the numeral 1 denotes as a whole a belling machine for pipes made of thermoplastic material, forming end sockets equipped with an integrated seal.

The belling machine 1 comprises means 2 for locking a pipe 3 made of thermoplastic material for keeping the pipe 3 coaxial with a belling machine 1 belling axis b and in the belling position.

As illustrated in the accompanying drawings, the pipe 3 locking means 2 comprise locking clamps 20. The clamps 20 have two jaws able to move along a vertical plane. The jaws can move independently of each other and their alignment with one another is guaranteed by the structure of the machine supporting the jaws.

Figure 15A:
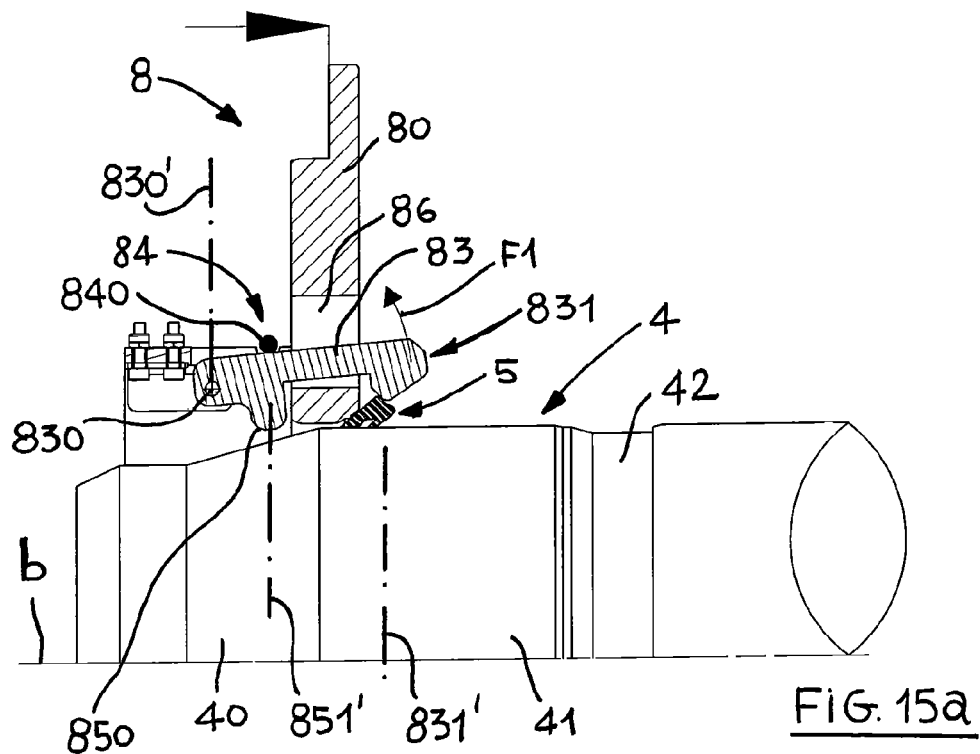
FIGS. 15a and 15b illustrate, in cross-section in an axial plane of the mandrel (the missing half of the structures being symmetrical relative to the axis of that illustrated), the step of the loader loading the seal on the mandrel, respectively in the step of the loader engaged on the mandrel (FIG. 15a) and the step of the loader disengaged from the mandrel (FIG. 15b), showing the cam mechanism for opening the gripper elements.
Figure 15B:
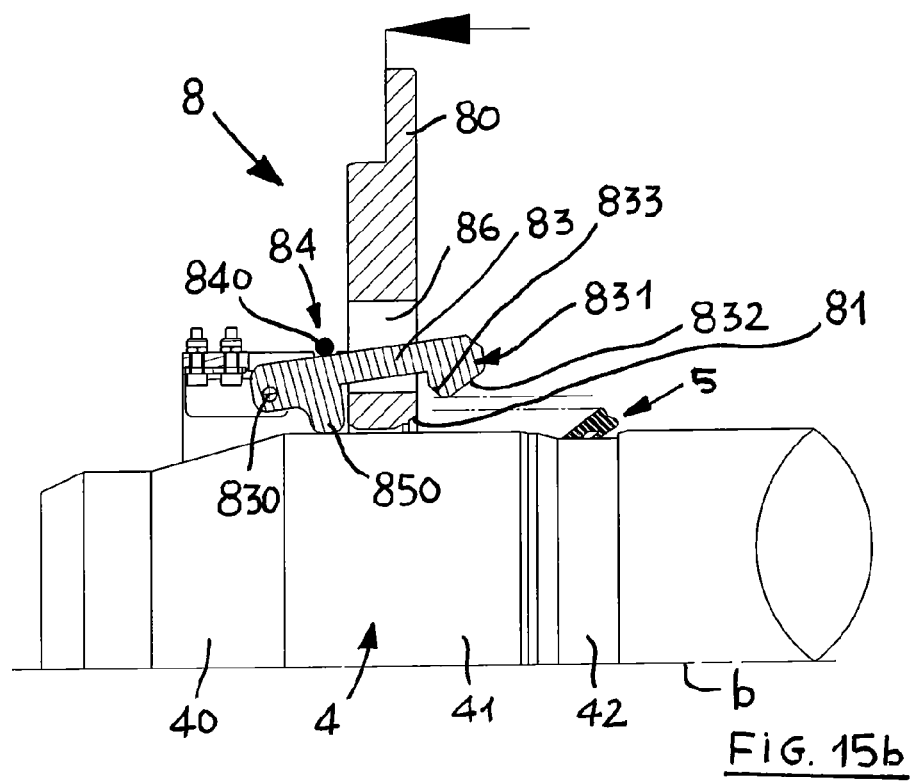
Figure 17:
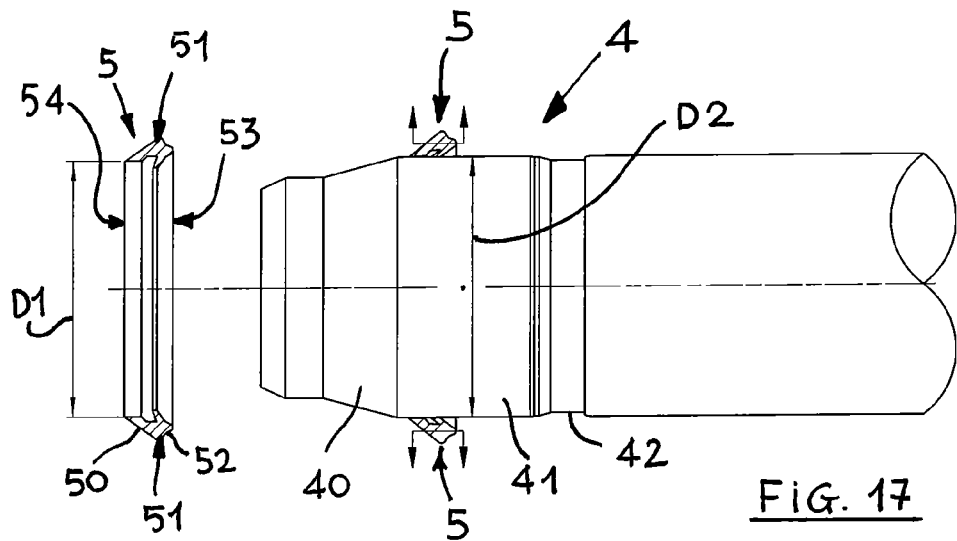
FIG. 17 illustrates the size relationship between the seal and the mandrel and several details of the forming mandrel.

The belling machine 1 also comprises a forming mandrel 4, which can be forcibly inserted in a heated end 30 of the pipe 3 for forming the end into a socket. For that purpose, the forming mandrel 4 can move, along the belling axis b and coaxial with it, between a back position in which it is disengaged from the pipe 3 (illustrated in FIGS. 2, 3, 4, 8b) and a forward position in which it is inserted in the end 30 of the pipe 3 (illustrated in FIGS. 1, 5 and 6). As shown in FIGS. 1 to 6 and in detail in FIGS. 15a, 15b, 17, the mandrel 4 comprises a tapered portion 40, its diameter increasing along the axis of the mandrel 4 away from the forward insertion position towards the rear disengaged position, followed, in that direction, by a cylindrical portion 41 whose diameter is equal to the maximum diameter of the tapered portion 40.

On the cylindrical portion 41 of the mandrel 4 it is possible to place, diametrically expanded, coaxially and in a predetermined position, an annular seal 5 to be integrated in the end 30 of the pipe 3 which has a socket formed on it.

In particular with reference to FIGS. 16 (I and II) and 17, the annular seals 5 usually comprise: an inner surface 55 (which in general may have a complex shape; in the "Rieber" type system, in particular, it does) having a minimum internal diameter D1; a front face 54, a rear face 53 and an outer edge 51. The outer edge 51 defines a front circumferential portion 50 and a rear circumferential portion 52 of the seal 5 (in the "Rieber" type system, in particular, the cross-section of the outer edge 51 defines two angled tangential sides: a front side, corresponding to the front circumferential portion 50, and a rear side, corresponding to the rear circumferential portion 52). As FIG. 17 also shows, the minimum internal diameter D1 of the seal 5 is less than the diameter D2 of the cylindrical portion 41 of the mandrel 4. Therefore, the tapered portion 40 facilitates fitting of the seal 5 on the mandrel 4. The cylindrical part 41, whose diameter is greater than the minimum internal diameter of the seal 5, causes a diametrical expansion of the annular seal 5 during fitting on the mandrel. When the annular seal 5 is fitted on the mandrel 4, the front face 54 of the seal 5 and the front circumferential portion 50 of the outer edge 51 are facing towards the tapered portion 40 of the mandrel 4.

The predetermined position in which the annular seal 5 must be placed on the cylindrical portion 41 of the mandrel 4 is normally defined by an annular groove 42 which acts as a cavity for insertion of the inner surface 55 of the seal 5.

The belling machine comprises seal 5 constraining means 6, intended to hold the seal 5 in the predetermined position on the cylindrical portion 41 at least during insertion of the forming mandrel 4 in the end 30 of the pipe 3.

In the preferred embodiment of the invention illustrated in the accompanying drawings, the constraining means 6 comprise a seal 5 contact flange 60. The flange 60 is coaxial with the mandrel 4 and able to move relative to the latter along the shared axis (the belling axis b) between a back position in which it is disengaged from the seal 5 predetermined position (FIGS. 1, 2, 3, 4, 6) and a forward position in which it makes contact with the rear of the seal 5 (FIG. 5). The mandrel 4 and the contact flange 60 are mounted on a forming carriage 43 moved by a suitable actuator 44. The forming carriage 43 is supported by the belling machine 1 structure. The contact flange 60 has its own guides 61 and actuators 62 which allow it the additional movement compared with the forming mandrel 4.

The belling machine 1 also comprises an apparatus 7 for loading the annular seal on the forming mandrel 4.

The loading apparatus 7 in turn comprises: a loader 8 for loading the annular seal 5 on the mandrel 4; an arming device 9 which arms the loader 8 with an annular seal 5; an annular seal 5 positioner 10 in which the annular seal 5 is placed in an operating position for the action of the arming device 9.

The loader 8 for loading the annular seal 5 on the mandrel 4 can move between an arming position (illustrated, in particular, in FIGS. 4, 7a, 10a to 10c), in which the loader 8 is spaced from the belling axis b and does not interfere with the mandrel 4 movement along the belling axis b, and a loading position (illustrated, in particular, in FIGS. 2, 3, 7b, 8b, 15a, 15b), in which the loader 8 is coaxial with the belling axis b and is located between the mandrel 4 back position, disengaged from the pipe 3 and the mandrel 4 forward position, inserted in the end 30 of the pipe 3.

The arming device 9 arms the loader 8 with an annular seal 5 when the loader 8 is in the arming position (FIGS. 4, 7a, 10a to 10c).

With reference in particular to FIGS. 14a to 14c and 15a and 15b, the loader 8 comprises an annular loading flange 80, designed so that the edge 81 of its inner circular opening 82 makes contact with the front circumferential portion 50 of the outer edge 51 of the annular seal 5. In this way, free diametrical expansion of the seal 5 is allowed when the loader 8 pushes it onto the mandrel 4. The inner circular opening 82 of the annular loading flange 80 has a diameter greater than the diameter of the cylindrical portion 41 of the mandrel 4. In this way, the annular loading flange 80 can slide on the mandrel 4 coaxially with it. The annular loading flange 80, annularly surrounding the inner circular opening 82, is rigid enough to guarantee precision in the step of loading the annular seal 5 on the forming mandrel 4 (described below). The structure of the annular loading flange 80 is preferably continuous.

Advantageously, as illustrated in the accompanying drawings, the edge 81 of the inner circular opening 82 of the annular loading flange 80 comprises, in the zone which makes contact with the front circumferential portion 50 of the edge of the annular seal 5, a tapered guide 810. On the surface of the tapered guide 810 facing towards the seal 5 there may be a thin annular rib.

Figure 10A:
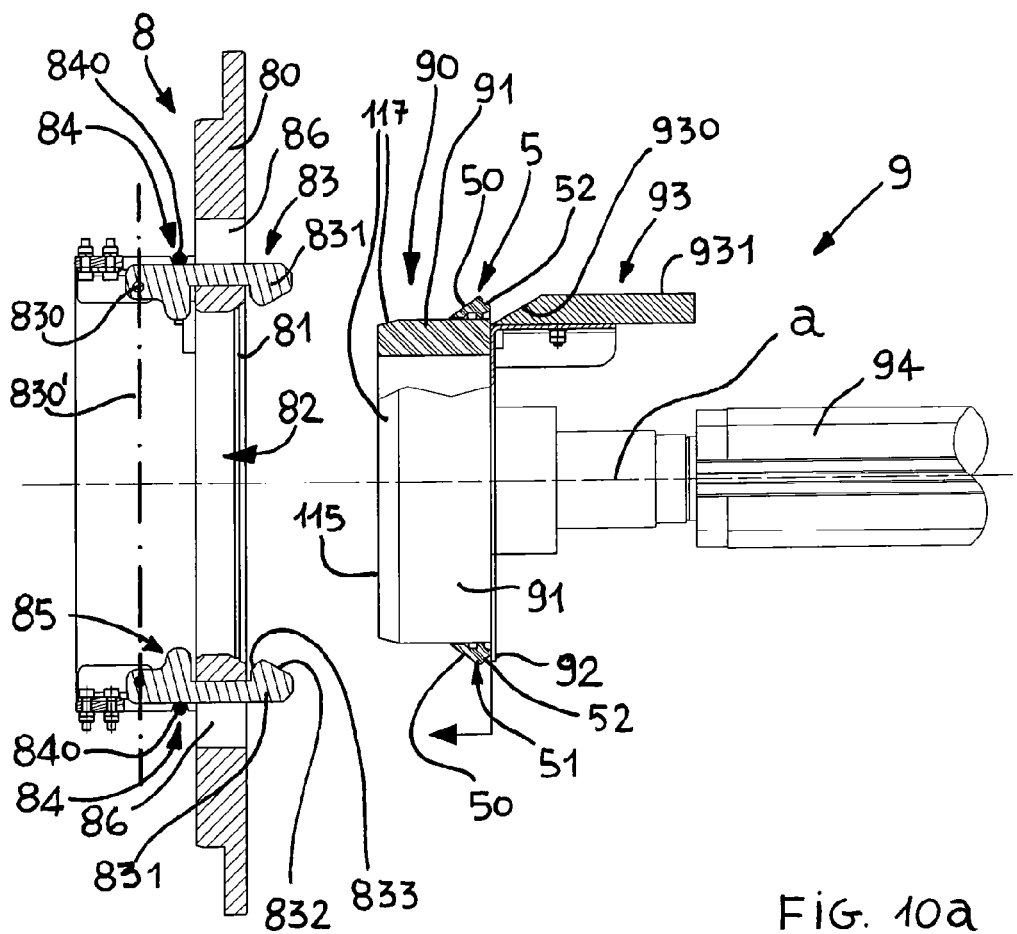
FIGS. 10a, 10b and 10c illustrate the steps of arming the loader, carried out by the arming device pusher which carries on it a seal picked up as the pusher passed through the positioner.
Figure 10B:
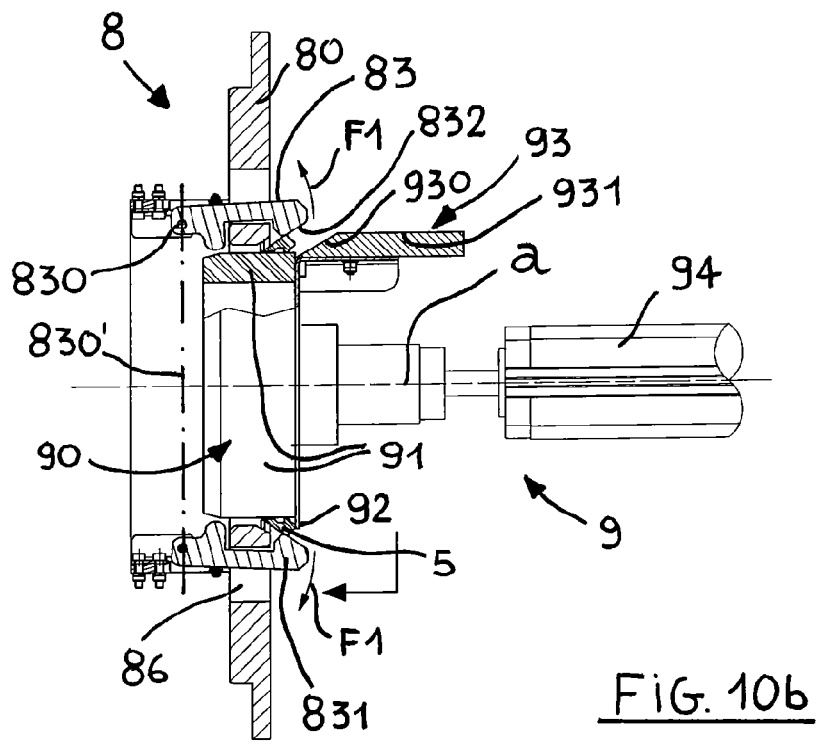

The loader 8 comprises a plurality of gripper elements 83, each rotatably constrained to the structure of the annular loading flange 80 at a respective pivot 830 and free to rotate there between a closed position and an open position about a respective axis parallel with the plane in which the annular loading flange 80 lies. In the closed position (illustrated in particular in FIGS. 10a, 10c, 14b, 14c), one end 831 of the gripper element 83 distal from the pivot 830 presses on the rear circumferential portion 52 of the outer edge 51 of the annular seal 5, holding it against the edge 81 of the inner circular opening 82 of the annular loading flange 80. In the open position (illustrated in particular in FIG. 15b, whilst FIG. 10b illustrates an intermediate position between the closed and open ones), the distal end 831 is spaced from the rear circumferential portion 52 of the outer edge 51 of the annular seal 5, leaving the seal 5 free to detach from the edge 81 of the inner circular opening 82 of the annular loading flange 80. The movement of the distal end 831 of each gripper element 83 from the closed position towards the open position is opposed by the action of elastic return elements 84. The gripper elements 83 are distributed along the edge 81 of the inner circular opening 82 of the annular loading flange 80 in such a way as to form a gripper device acting in a self-centring way on the annular seal 5 towards the edge 81 of the inner circular opening 82 of the annular loading flange 80. The seal 5 is held in the loader 8 in such a way that it is centred. The self-centring arrangement of the gripper elements 83 and the opposing action of the elastic return elements 84 allow the seal 5 to be held in the correct position during the step of loading on the mandrel 4, described below.

Appropriately, as illustrated in the accompanying drawings (in particular in FIGS. 14a and 14c) the axes of rotation of the gripper elements 83 at the pivots 830 are parallel with the plane of the annular loading flange 80. Each gripper element 83 rotates in a respective diametrical plane of the annular loading flange 80 parallel with the axis of the latter. The loader 8 comprises a plurality of gripper elements 83. There is preferably an even number of gripper elements 83. Advantageously, as illustrated in FIG. 14a, the gripper elements 83 are arranged in pairs on opposite sides of the axis of the annular loading flange 80. The gripper elements 83 preferably rotate in a diametrical plane of the annular loading flange 80. Advantageously, the gripper elements 83 of each pair formed in this way have the same plane of rotation, coinciding with a diametrical plane of the annular loading flange 80, and they have axes of rotation which are different but parallel.

There are usually four gripper elements 83. The gripper elements 83 are positioned at the vertices of a rectangle centred on the axis of the annular loading flange 80 (FIG. 14a).

Each gripper element 83 may be equipped with a respective elastic return element 84. In the preferred embodiment of the invention illustrated in the accompanying drawings, the elastic return elements 84 which return the distal ends 831 of the gripper elements 83 to the closed position comprise an elastic ring 840 circumferentially wrapped around the gripper elements 83 on the outside of the latter, placed between the pivots 830 and the distal ends 831.

When the loader 8 is in the loading position, with the mandrel 4 in the back position, disengaged from the pipe 3 (see for example FIG. 2 and the corresponding detail FIG. 7b), the inner circular opening 82 of the annular flange 80 is coaxial with the belling axis b and keeps the rear face 53 of the annular seal 5 facing towards the mandrel 4. The rear circumferential portion 52 of the outer edge 51 of the seal 5 belongs to said rear face.

With reference in particular to FIGS. 2, 3, 8b, 15a, 15b, from the loading position, with the mandrel 4 in the back position, disengaged from the pipe 3, the loader 8 can move relative to the mandrel 4 along the belling axis b at least as far as a position for releasing the annular seal 5 onto the cylindrical portion 41 of the mandrel 4, coinciding with the predetermined position of the annular seal 5 on the cylindrical portion 41 of the mandrel 4. The loader 8 moves from the loading position to the releasing position through a series of intermediate positions in which the inner circular opening 82 of the annular flange 80 is fitted on the mandrel 4, passes along its tapered portion 40 and its cylindrical portion 41, conveying the annular seal 5 with it and causing the seal to expand diametrically along the tapered portion 40 of the mandrel 4. The loader 8 also comprises means 85 for mechanical interference with the surface of the mandrel 4, which are operatively connected to the gripper elements 83. On at least an end part of the tapered portion 40 and during the passage onto the cylindrical portion 41 the loader 8 means 85 for mechanical interference with the surface of the mandrel 4 interfere with the lateral surface of the mandrel 4, which acts as a mechanical cam, and they cause the gradual movement of the distal end 831 of each gripper element 83 from the closed position towards the open position, leaving the rear face 53 of the annular seal 5 free. The action of the means 85 for mechanical interference with the surface of the mandrel 4, on which the mandrel 4 acts as a cam, is applied in opposition to the elastic return of the elastic return means 84 which return the distal ends 831 of the gripper elements 83 to the closed position. Until the action of the means 85 for mechanical interference with the surface of the mandrel 4 forces the distal ends 831 to completely detach from the seal 5, the elastic return means 84 continue to hold the distal ends 831 in contact with the seal 5, guaranteeing correct seal centring and positioning on the mandrel 4 as far as necessary (in particular until it has passed the tapered portion 40 of the mandrel 4).

From the position where it releases the annular seal 5 on the cylindrical portion 41 of the mandrel 4, the loader 8 can move relative to the mandrel 4 along the belling axis b with a return movement towards the loading position. The gripper elements 83 remain in the open position at least for an initial stretch of that return movement due to the action of the means 85 for mechanical interference, and they allow annular seal 5 release and consequent positioning in the predetermined position on the cylindrical portion 41 of the mandrel 4 (see in particular FIG. 15*b*).

Advantageously, the respective pivots 830 of the gripper elements 83 are constrained to the loader 8 on the side of the annular loading flange 80 opposite that with which the annular seal 5 makes contact. The gripper elements 83 pass through the annular flange 80 in suitable respective through-slots 86 which allow them to rotate about the pivot 830 between the closed position and the open position, in such a way that the ends 831 distal from the pivots are kept on the side of the annular loading flange 80 with which the annular seal 5 makes contact. Advantageously, the through-slots 86 surround the gripper elements 83 on four sides. In this way, the rigidity of the annular loading flange 80 is not reduced.

The pivots 830 of the gripper elements 83 define a pivoting plane 830'. The distal ends 831 of the gripper elements 83 define a gripping plane 831'. The pivoting plane 830' and the gripping plane 831' are both parallel with the annular loading flange 80 and positioned on opposite sides of it.

The means 85 for mechanical interference with the surface of the mandrel 4 comprise, on each gripper element 83, a corresponding shaped projection 850, located between the pivot 830 and the distal end 831 of the gripper element 83 and pointing towards the inner circular opening 82 of the annular loading flange 80. The shaped projection 850 has a predetermined length designed to allow, when the annular loading flange 80 is fitted on the mandrel 4, interference of the shaped projection 850 at least with an end part of the tapered portion 40 of the mandrel and with the subsequent cylindrical part 41 of the mandrel 4. The ends of the shaped projections 850 define a respective interference plane 851'. The interference plane 851' is parallel with the pivoting plane 830' and the gripping plane 831' and lies between them.

The shape of the distal end 831 of each gripper element 83 and the respective position, with the distal end 831 in the closed position, adopted by the pivot 830 of each gripper element 83 and the respective distal end 831, are such that a thrust applied on a lower front portion 832 of the distal end 831 towards the annular loading flange 80 along the axis of the inner circular opening 82 of the annular loading flange 80 produces a movement of the distal end 831 towards the respective open position. The use of and logic behind this feature are apparent in the following description of the structure dedicated to loader 8 arming and its operation.

In the preferred embodiment of the invention, specifically illustrated by way of example in the accompanying drawings, the distal end 831 of each of the gripper elements 83 has two angled flat surfaces, together forming a dihedron whose rounded edge is facing towards the axis of the inner circular opening 82 and each corresponding, respectively, to the lower front portion 832 and to an adjacent lower rear portion 833 of the distal end 831.

The structure of the loader 8 allows the seal to be released when the seal is correctly positioned on the mandrel 4 thanks to the fact that the outer surface of the forming mandrel 4 acts as a mechanical cam for activating opening of the loader 8 gripper elements 83. In this way, annular seal 5 axial alignment with the mandrel 4 is always guaranteed during the entire loading step as well as the fact that the seal 5 loaded on the mandrel 4 will not interfere with the loading devices during disengagement of the annular loading flange 80 from the mandrel 4. The diameter of the cylindrical portion 41 of the mandrel 4 is an invariable characteristic element of the socket to be formed, therefore even the size precision of the cam mechanism which is the surface of the mandrel 4 is established by the dimensions of the socket.

The arming device 9 comprises a pusher 90, coaxial with a belling machine 1 arming axis (a). The pusher 90 can move along the arming axis (a) between a first limit position for disengagement from the positioner 10 (schematically illustrated in FIG. 7*b* with the dashed line labelled A) and a second limit position for arming the loader 8 with the annular seal 5 (illustrated in FIG. 10*c*). The annular seal 5 positioner 10 is located on the arming axis (a) between the loader 8 arming position and the first limit position for pusher 90 disengagement. The pusher 90 comprises a cylindrical part 91, with a diameter less than the diameter of the cylindrical portion 41 of the mandrel 4 and such that it does not interfere with the means 85 for mechanical interference with the mandrel 4 when inserted in the inner circular opening 82 of the annular loading flange 80 coaxially with the latter. The cylindrical part 91 of the pusher 90 is intended to be inserted in the annular seal 5 without causing seal diametrical expansion and to support the seal 5 during the arming movement until the seal 5 is released in the loader 8. The diameter of the cylindrical part 91 of the pusher 90 is less than or equal to the internal diameter D1 of the annular seal 5. The pusher 90 comprises flat contact portions 92 lying in a plane which is perpendicular to the arming axis (a). The flat contact portions project outside the cylindrical part 91 of the pusher 90 and are intended to make contact with the rear face 53 of the annular seal 5.

The positioner 10 comprises a cradle 100 in which an annular seal 5 can be deposited. The lower part of the depositing cradle 100 is limited by a semi-circular supporting surface 101 whose concavity is facing towards the arming axis (a). The semi-circular supporting surface 101 is intended to support the annular seal 5 with a circumferential part 50, 52 of a portion of the outer edge 51 of the seal 5 resting on it. The circumferential part 50, 52 of the portion of the outer edge 51 of the seal 5 comprises the front circumferential portion 50 and/or the rear circumferential portion 52 of the outer edge 51 of the seal 5. The supporting surface 101 has a diameter equal to or slightly greater than the outer diameter of the annular seal 5.

Figure 11:
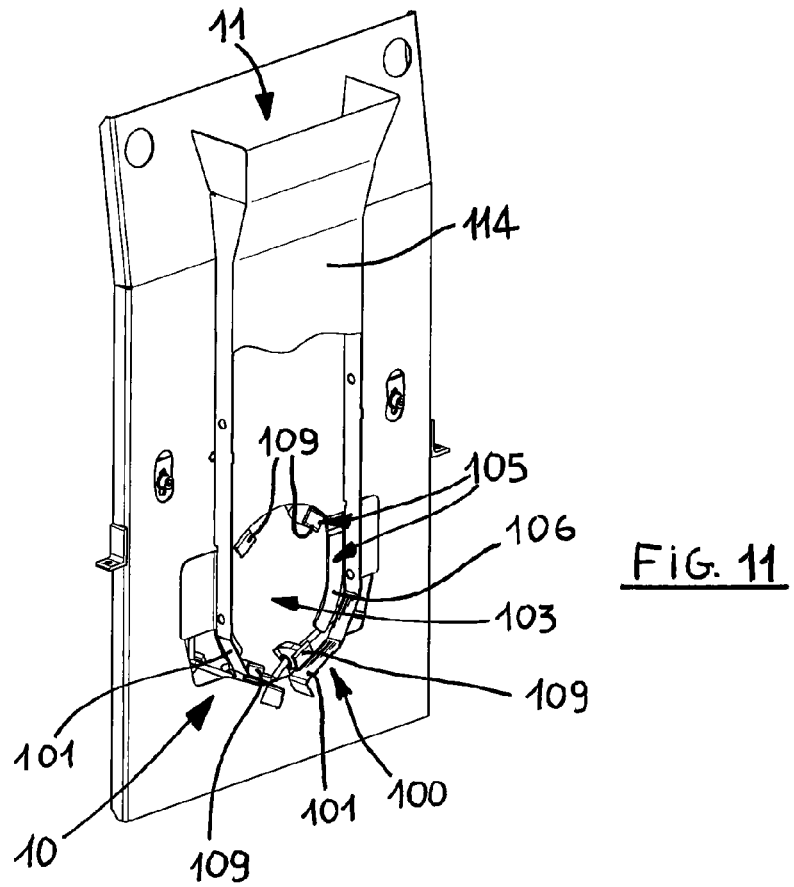
FIG. 11 is a perspective front view with part of the front surface split to highlight several details, of the loading apparatus positioner (in the embodiment in which it is integrated in the lower part of a feed hopper)

The front of the depositing cradle 100 is limited, towards the pusher 90 first limit position, by a flat supporting surface 102 which is perpendicular to the arming axis (a). In FIG. 11 the flat supporting surface 102 has been at least partly cut away to better illustrate the inner structures of the positioner 10. The flat supporting surface 102 comprises an opening 103 for the passage of the pusher 90. The rear face 53 of the annular seal 5 and/or the rear circumferential portion 52 of the outer edge 51 of the annular seal 5 is intended to rest on an edge 104 of the opening 103.

The back of the depositing cradle 100 is limited, towards the loader 8 arming position, by annular seal 5 supporting elements 105 on which a front face 54 of the annular seal 5 and/or the front circumferential portion 50 of the outer edge 51 of the annular seal 5 is intended to rest.

The positioner 10 supporting elements 105 can move between a first configuration, close to the arming axis (a), for supporting and guiding the front face 54 of the annular seal 5 and/or the front circumferential portion 50 of the outer edge 51 of the annular seal 5, and a second configuration, spaced from the arming axis (a) and in which the pusher 90 and the annular seal 5, loaded on the cylindrical part 91 of the pusher 90 and making contact with the respective flat contact portions 92, are free to pass through the positioner 10 and to reach the loader 8 located in the arming position. The passage from the first to the second configuration of at least part of the supporting elements 105 is caused by the thrust from the seal 5 due to the contact between the seal 5 and the flat contact portions 92. The first configuration of the supporting elements is illustrated in FIG. 11, whilst the second configuration is illustrated in FIG. 12a.

As illustrated in FIGS. 7a, 10a to 10c, when the loader 8 is in the arming position, the inner circular opening 82 of the annular flange 80 is coaxial with the belling machine 1 arming axis (a) and the distal ends 831 of the gripper elements 83 remain facing towards the positioner 10, the distal ends 831 being in the closed position when there is no annular seal 5 in the loader 8.

In the movement from the first to the second limit position, the pusher 90 passes through a series of intermediate positions one after another, in which the following occurs.

Figure 10C:
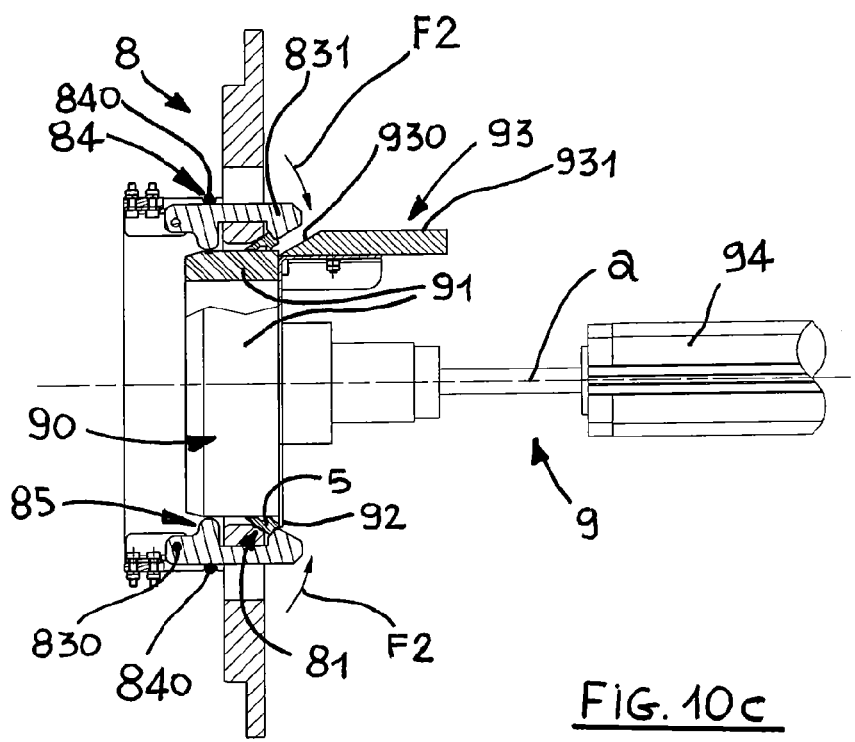

The pusher 90 reaches the opening 103 in the cradle 100 flat supporting surface 102 (FIG. 11a), penetrates it and, with the contact offered by at least part of the positioner 10 supporting elements 105 which have not yet reached the second configuration, the pusher is inserted in the annular seal 5 positioned in the cradle 100 and carries the seal on its cylindrical part 91, sliding inside the seal until the rear face 53 of the annular seal 5 makes contact with the pusher 90 flat contact portions 92. When the rear face 53 of the annular seal 5 makes contact with the flat contact portions 92 of the pusher 90, the thrust that the annular seal 5 consequently applies causes said at least part of the positioner 10 supporting elements 105 to pass from the first to the second configuration (FIG. 12a) and the possibility for the pusher 90, with the annular seal 5 loaded on the cylindrical part 91, to pass through the positioner 10 and reach the loader 8 in the arming position (FIG. 10a, from which the positioner 10 has been cut away for greater clarity). The combined action of the supporting elements 105 and the pusher 90 flat contact portions 92 allows correct positioning of the seal 5 on the cylindrical part 91 of the pusher 90. As illustrated in FIGS. 10a to 10c, the front circumferential portion 50 of the outer edge 51 of the annular seal 5 makes contact with the lower front portion 832 of the distal end 831 of the gripper elements 83 and applies on it, due to the action of the pusher 90 flat contact portions 92, a thrust towards the annular loading flange 80 along the axis of the circular opening 82 which produces the movement of the distal end 831 towards the respective open position (movement indicated by the arrow F1 in FIG. 10b and described above). The further movement of the pusher 90 causes the annular seal 5 to pass beyond the distal end 831 and, due to the action of the elastic return means 84, reclosing of the distal end 831 on the rear circumferential portion 52 of the outer edge 51 of the annular seal 5 and consequent contact between the latter and the edge 81 of the inner circular opening 82 of the annular loading flange 80 (see FIG. 10c, where the reclosing movement of the distal end 831 of the gripper elements 83 is indicated by the arrow F2). Thus the pusher 90 has reached the second limit position for arming the loader 8 with annular seal 5.

From the second limit position for arming the loader 8 with annular seal 5, the pusher 90 can move relative to the loader 8 along the arming axis (a) with a return movement towards the first limit position for disengagement from the positioner 10, the annular seal 5 remaining retained by the gripper elements 83 in the loader 8 and leaving the pusher 90 free.

Therefore, arming the loader 8 with annular seal 5 is performed rapidly, automatically and without difficulty. The pusher 90 disengages from the loader 8 easily and without consequences. The gripper elements 83, by means of the shape of the lower front portions 832 of their distal ends 831, form (in particular, for elements located around the inner circular opening 82 of the annular loading flange 80) an entrance surface such that they create a step of opening of the gripper elements 83 at the moment when they first make contact with the seal 5, followed by a step of closing and clamping of the gripper elements 83 on the annular seal 5 when the latter is resting on the annular loading flange 80. In particular, when the gripper elements 83 rotate in diametrical planes of the annular loading flange 80, the entrance surface approximates at least stretches of a tapered surface which opens towards the seal 5. In this case, when the distal end 831 of each of the gripper elements 83 has two angled flat surfaces, together forming a dihedron whose edge is facing towards the axis of the inner circular opening 82 (and each corresponding, respectively, to the lower front portion 832 and to an adjacent lower rear portion 833 of the distal end 831), the stretches of tapered entrance surface are created by those angled flat surfaces of each dihedron corresponding to the lower front portions 832 of the distal ends 831 of the gripper elements 83.

When the loader 8 is in the arming position, the pusher 90, the depositing cradle 100 circular opening 103, the annular seal 5 deposited in the depositing cradle 100 and the loader 8 are aligned along the arming axis (a). The pusher 90 moves along the arming axis (a) driven by a suitable actuator 94.

Figure 11A:
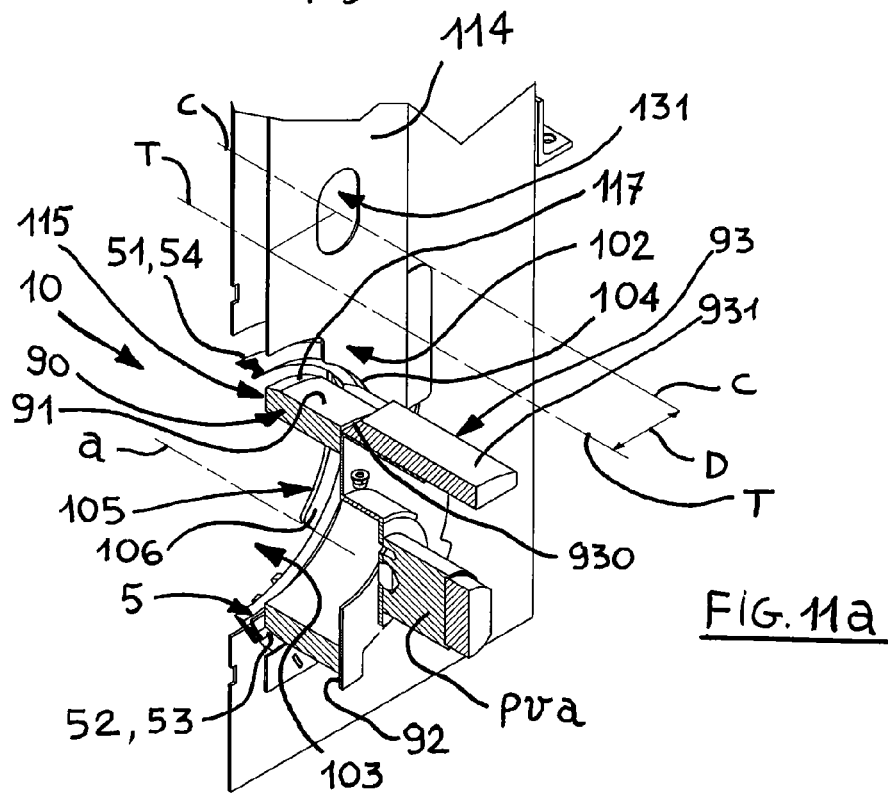
FIG. 11a is a split perspective view of a detail of the positioner of FIG. 11, showing the presence of a seal in the positioner and with the arming device pusher about to load the seal on itself.

With reference in particular to FIG. 11a, when the pusher 90 is in front of the cradle 100 before the actual arming step, it supports on its front side 115 the annular seal 5 deposited on the semi-circular supporting surface 101. The front side 115 of the pusher 90 preferably comprises a tapered guide 117 which promotes pusher 90 engagement with the seal 5. In this way the seal 5 is correctly positioned relative to the pusher 90.

Figure 12:
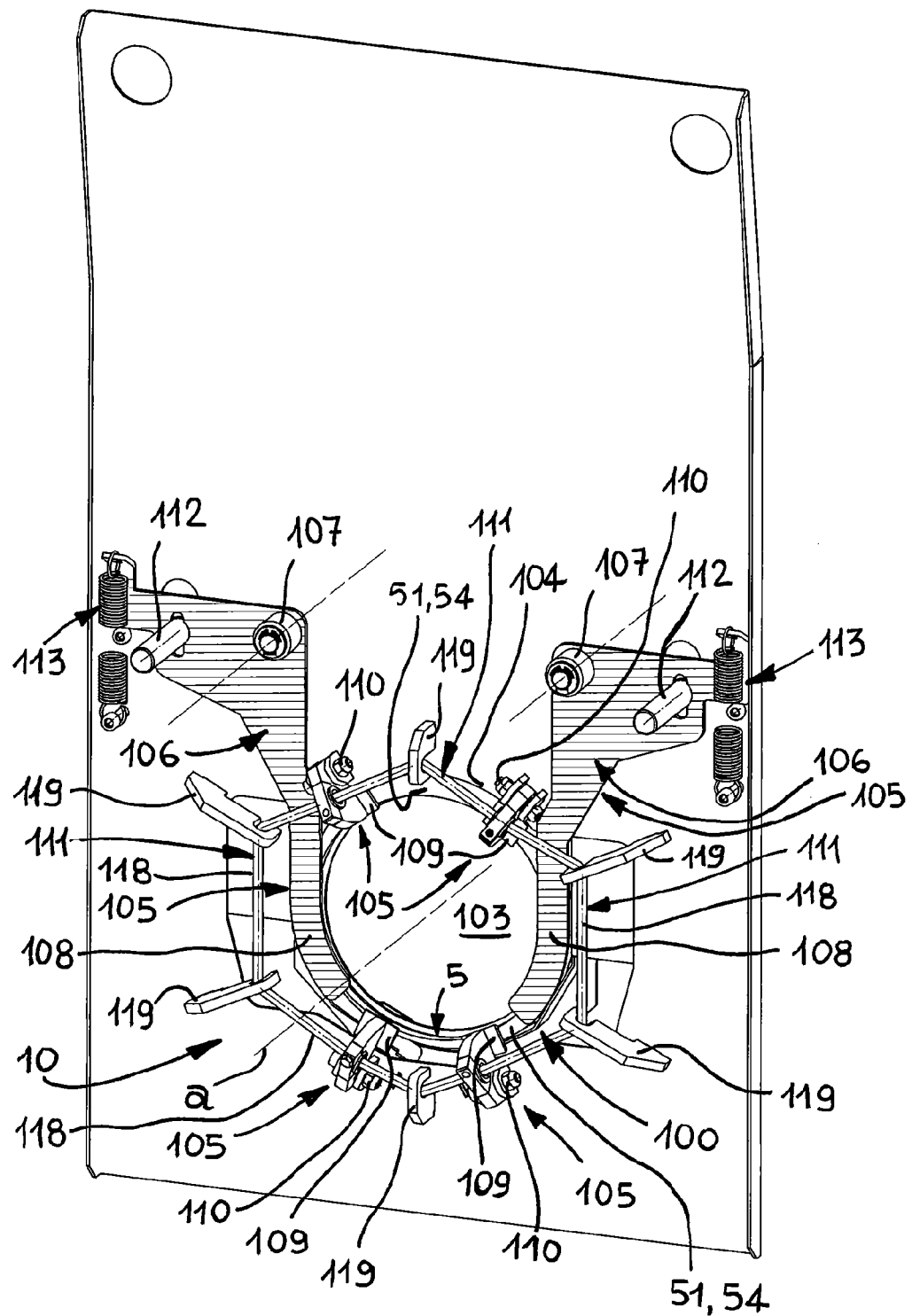
FIG. 12 is a perspective rear view of the positioner (and the respective hopper) of FIG. 11, showing the flaps of the seal supporting elements illustrated in the configuration close to the arming axis, in which they support the annular seal and form a guide for it at the moment when the seal is placed in the positioner.
Figure 12A:
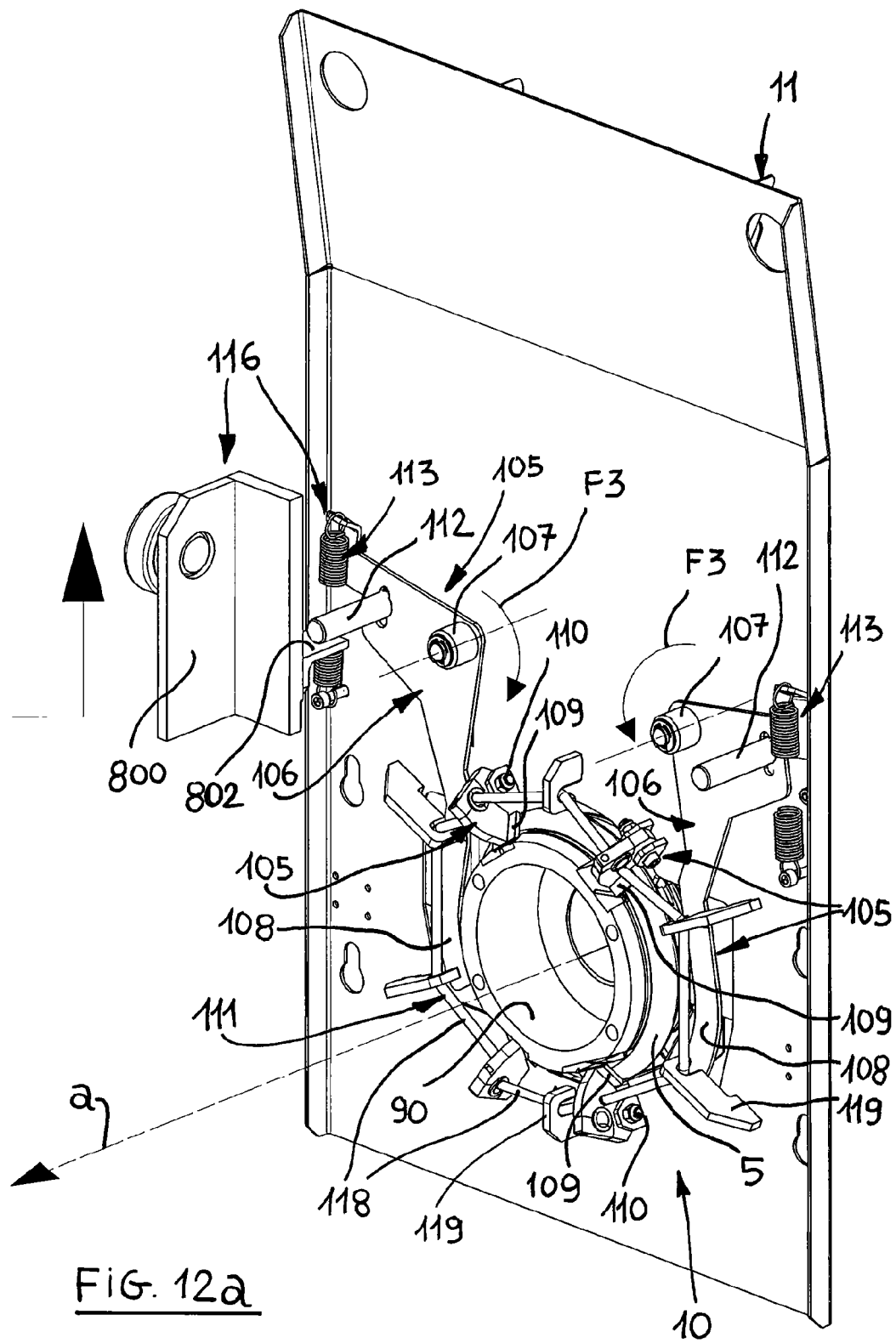
FIG. 12a is a similar view to that of FIG. 12 with the flaps in the configuration spaced from the arming axis, showing the front part of the pusher inserted in the opening in the positioner and about to begin pushing on the supports which remain in position on the seal.

With reference in particular to FIGS. 11, 12, 12a, advantageously, in the positioner 10 the supporting elements 105 for the annular seal 5 comprise flat elements in the form of mobile flaps 106, each rotating at a respective pivot 107 about a respective axis parallel with the arming axis (a) between a first and a second limit condition, respectively corresponding, in the case of the flaps 106, to the first and the second configurations of the supporting elements 105. The first limit condition of the flaps 106 (corresponding, in the case of the flaps 106, to the first configuration of the supporting elements 105) is illustrated in FIGS. 11 and 12. The flaps 106 have stretches 108 positioned at the sides of the arming axis (a). The flaps 106 are in the first configuration (which, being the first configuration of the supporting elements 105, is also their first configuration, since the flaps 106 are supporting elements, and corresponds to the first limit condition of the flaps 106) when the loader 8 is not in the arming position. The flaps

106, due to the action of the respective movement means, move from the first to the second configuration when the loader 8 moves from the loading position to the arming position and, vice versa, they move from the second to the first configuration when the loader 8 moves from the arming position to the loading position (obviously, the second configuration, since it is the second configuration of the supporting elements 105 is also the second configuration of the flaps 106, because the flaps 106 are supporting elements, and corresponds to the second limit condition of the flaps 106).

The second limit condition of the flaps 106 (corresponding, in the case of the flaps 106, to the second configuration of the supporting elements 105) is illustrated in FIG. 12*a*.

The flaps 106 move from the first to the second configuration and vice versa (that is to say, from the first to the second limit condition and vice versa) under the action of respective movement means 116 which are activated when the loader 8 is moved from the loading position to the arming position and vice versa. A preferred example embodiment of the movement means 116, particularly advantageous and simple, is described below. The movement of the flaps 106 from the first to the second configuration is indicated in FIG. 12*a* by the arrows F3.

The flaps 106 at least partly close the depositing cradle 100 on the side facing towards the loading position (therefore, also towards the annular loading flange 80 when the loader 8 is in the loading position).

With reference in particular again to FIGS. 11, 12 and 12*a*, advantageously, in the positioner 10 the supporting elements 105 for the annular seal 5 also comprise supports 109 distributed about the arming axis (a) in the stretches not covered by the flaps 106, in positions which do not interfere with the flat portions 92 of the pusher 90 when the latter passes through the positioner 10. The supports 109 are intended to support the annular seal 5 at the moment when the flaps 106 move to the second configuration.

The supports 109 form the at least one part of the supporting elements 105 whose passage from the first to the second configuration is caused by the thrust from the annular seal 5 due to the contact between the seal 5 and the flat contact portions 92 of the pusher 90 as the pusher 90 passes through the positioner 10. The movement of the supports 109 between the first and second configurations is a rotation about axes of rotation which are parallel with the plane of the flat supporting surface 102 at respective pivots 110 under the opposing action of respective elastic opposing means 111 which tend to keep the supports 109 in the first configuration.

The supports 109 are distributed around the arming axis (a) in such a way as to form a self-centring supporting system for the annular seal 5. Appropriately, the number of supports 109 is greater than or equal to three, being positioned circumferentially around the opening 103 in the flat surface 102. The supports 109 preferably rotate in a plane coinciding with a respective plane parallel with the arming axis (a) and passing through a respective diameter of the opening 103 in the supporting surface 102. There is preferably an even number of supports 109, positioned in pairs with the plane of rotation coinciding with a respective plane parallel with the arming axis (a) and passing through a respective diameter of the opening 103 in the supporting surface 102. In the embodiment illustrated in the accompanying drawings, the supports 109 are positioned at the vertices of a rectangle centred on the arming axis (a) and lying in a plane parallel with that of the opening 103 in the supporting surface 102. The supports 109 open under the thrust from the seal 5 during arming and close again automatically due to the action of the elastic opposing means 111. The elastic opposing means 111 may comprise elastic elements, such as torsion springs, each applied individually to each support 109. The elastic opposing means 111 preferably comprise a single elastic element 118 closed in a loop and simultaneously applied on all of the supports 109. As shown in FIGS. 12 and 12*a*, the looped elastic element 118 is preferably kept under tension by tensioners 119 positioned around the opening 103 in the supporting surface 102 and located at the vertices of a regular hexagon. The supports 109 are located on four sides of the hexagon, in consecutive pairs.

As shown in the accompanying drawings, the annular loading flange 80 is housed on a slide 800 which can move, driven by the action of respective movement means 803, along respective guides 801 between two limit positions respectively corresponding to the loader 8 loading position and arming position. The movement means 803 may be made with any type of actuator suitable for making the slide 800 slide in the guides 801. The accompanying drawings show a movement system using cylinders and actuator pistons.

Figure 7A:
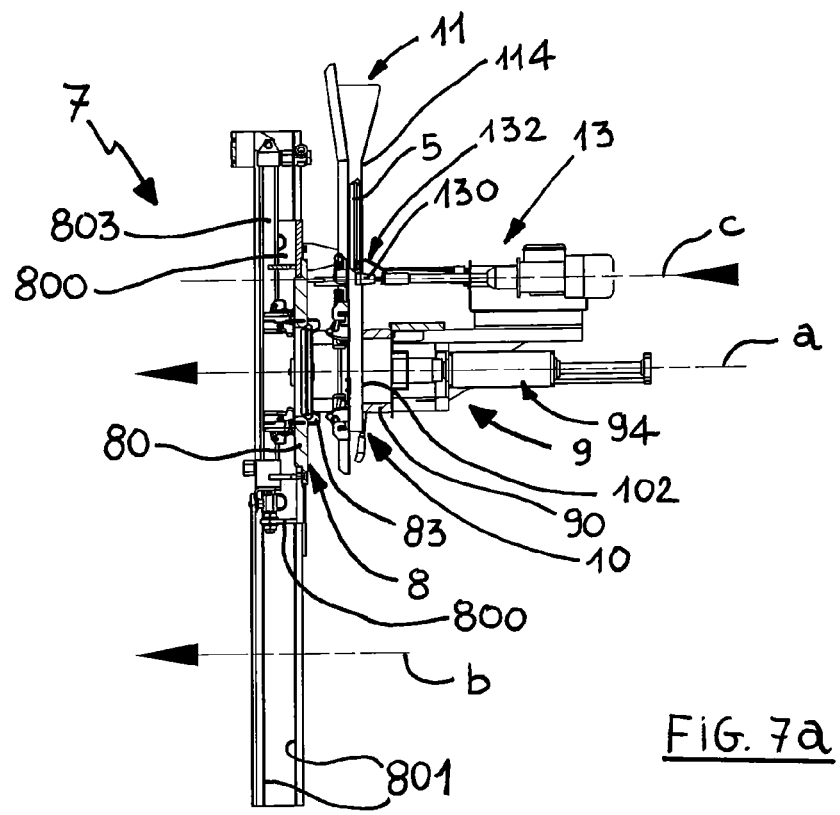
FIGS. 7a and 7b illustrate a detail, partly in cross-section, of the loading apparatus (according to a similar view to that of FIGS. 1 to 6), with the loader respectively in the arming position (FIG. 7a) and in the loading position (FIG. 7b)
Figure 7B:
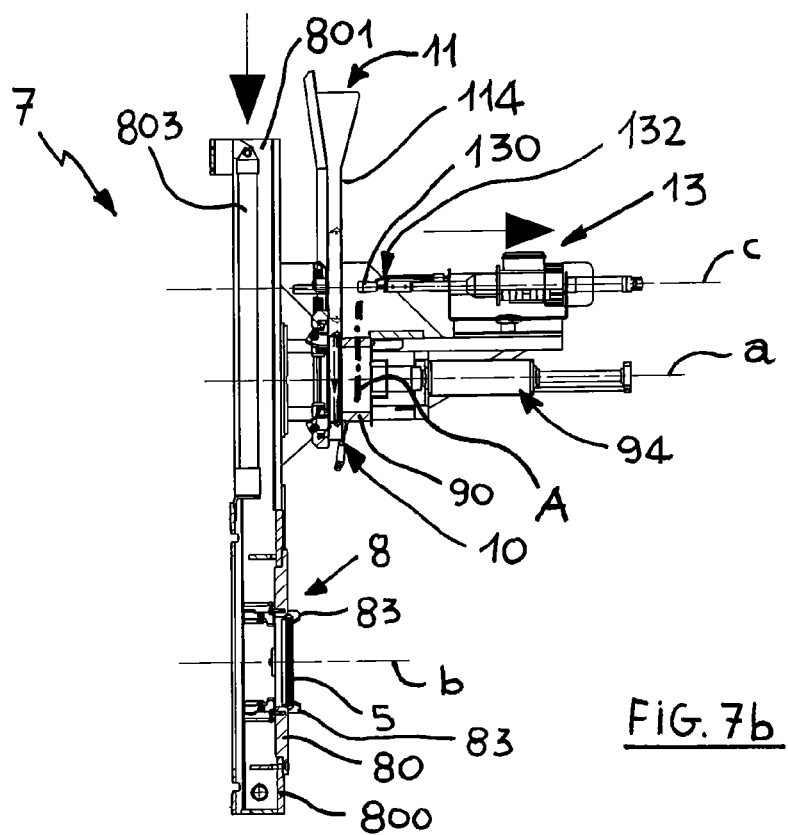
Figure 8A:
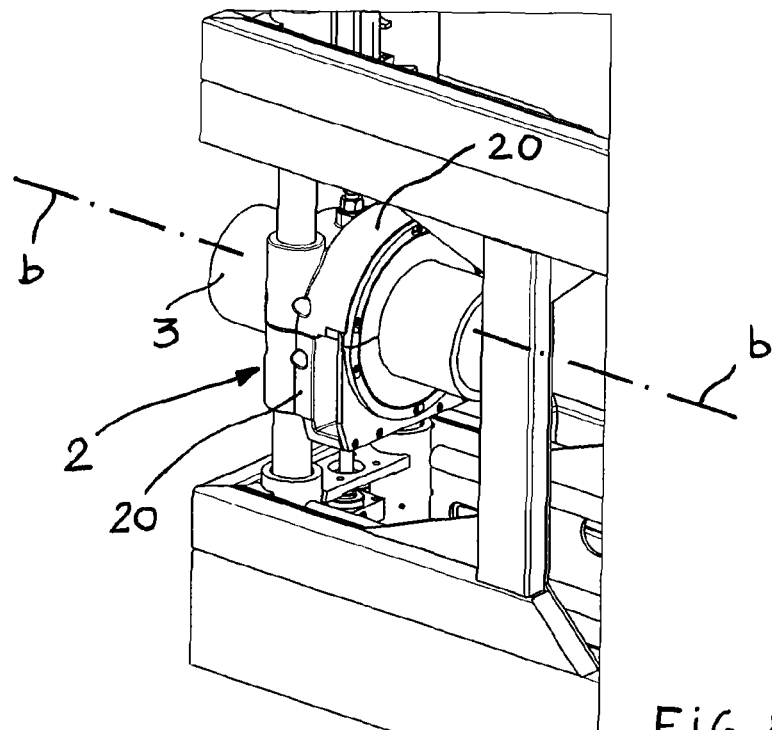
FIG. 8a is a perspective view of a detail of the action zone of the locking clamps on the pipe on whose end a socket is to be formed, with the forming chamber in its position spaced and disengaged from the pipe.
Figure 8B:
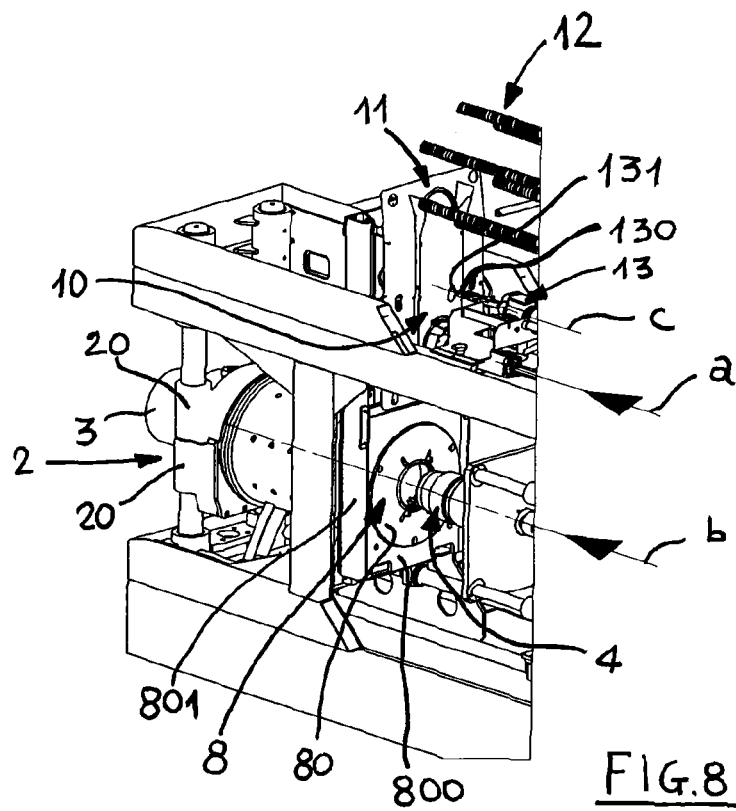
FIG. 8b illustrates a detail of the zone of the machine of FIG. 8a, showing: the forming chamber in contact with the locking clamps and engaged on the pipe, the loader in the loading position in front of the mandrel which is in the back position disengaged from the pipe.
Figure 9A:
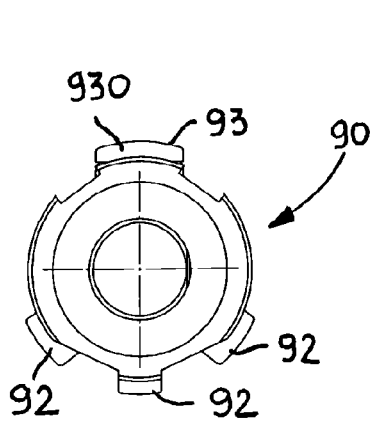
FIGS. 9a and 9b are respectively a front view and a perspective view of an arming device pusher.
Figure 9B:
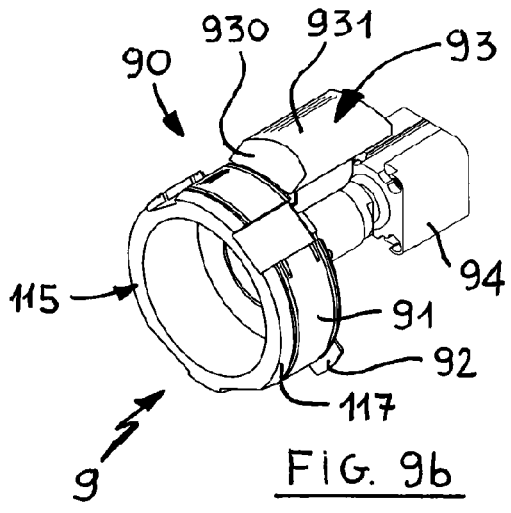

When the belling machine 1 comprises the slide 800, the flap 106 movement means 116 may have the following, very simple and advantageous, embodiment. Each flap 106 comprises a respective projection 112 intended to interact with a respective cam 802 integral with the slide 800 (FIG. 12*a*). When the slide 800 moves from the limit position corresponding to the loader 8 loading position to the limit position corresponding to the loader 8 arming position, each cam 802 acts on the respective projection 112 of a flap 106, causing the flap 106 to open and remain in the second configuration for as long as the loader 8 is in the arming position (FIGS. 7*a* and 12*a*). When the slide 800 moves from the limit position corresponding to the loader 8 arming position to the limit position corresponding to the loader 8 loading position, each cam 802 stops acting on the respective projection 112 of a flap 106 and the action of the flap 106 elastic return means 113 (for example, springs) cause the flaps to close and be kept in the first configuration for as long as the loader 8 is in the loading position (FIGS. 7*b*, 12).

The cams 802, the projections 112 and the flap 106 elastic return means 113 are part of the flap 106 movement means.

Preferably, as shown in the accompanying drawings, the belling axis (b) and the arming axis (a) are parallel with each other and lie in the same vertical feed plane (pva), with the arming axis (a) located above the belling axis (b). The vertical feed plane (pva) is parallel with (or coincides with) the plane of the page in: FIGS. 1 and 3, FIGS. 2 to 6, 7*a*, 7*b*, 10*a* to 10*c*, 13, 14*b*, 15*a*, 15*b*, 18*b*, 18*c*, 19*a*, 19*b*. When the belling machine 1 adopts this geometric configuration and comprises the slide 800 for moving the annular loading flange 80, the guides 801 guide the movement of the slide 800 along a vertical axis belonging to the vertical feed plane (pva). With the vertical feed plane (pva) as defined, it is easy to feed the positioner 10 with the annular seal 5 by dropping the latter from above, for example using a conveyor device comprising a hopper 11.

Advantageously, as illustrated in the accompanying drawings, the positioner 10 is made in the lower part of an annular seal 5 feed hopper 11. The hopper 11 receives the annular seal 5 which is dropped from a distribution magazine 12 and conveys it to the positioner 10. The flaps 106 in the closed position (that is to say, in their first configuration as supporting elements 105) provide continuity with the surface of the hopper 11, that is to say, a continuous containment guide for the annular seal 5 as it drops inside the hopper 11. This aids correct positioning of the annular seal 5 in the positioner 10 cradle 100. Given the action and behaviour of the supporting elements (and of the flaps 106 in particular), with the annular seal 5 deposited in the cradle 100, insertion of the pusher 90 for transferring the seal 5 into the loader 8 is only allowed when the guide flaps 106 are opened. As already indicated, the guide flaps open, due to the effect of respective movement means 116, when the loader 8 moves to the arming position, aligned with the arming axis (a).

The hopper 11 receives the annular seal 5 directly from the seal 5 distribution magazine 12 which, preferably, feeds the hopper 11 with one seal 5 at a time. A non-binding example which does not limit the invention in any way could be a distribution magazine 12 comprising one or more rods 120, each rotating about its own axis. As shown, in particular, in FIG. 19a, each rod 120 comprises worm screw-shaped separator walls 121, for keeping the annular seals 5 separate from each other. Rotation of the rods 12 about their axes causes feeding of the seals 5 located between the separator walls 121. A complete revolution of a rod 120 about its axis corresponds to feeding of the seals 5 over a distance equal to the pitch of the worm screw based on which the separator walls 121 are shaped. The end of the worm screw (corresponding to a free end of the rod 120) is positioned above the hopper 11 entrance at the moment when an annular seal 5 must be unloaded into it. There may be control and/or sensor means for checking the correct movement of the annular seals 5 in the magazine 12. When there are two or more rods 120, they are joined parallel with each other in a carousel 122 which may be made to rotate about an axis parallel with the axes of the rods 120. The distribution magazine 12 is equipped with movement and control means 123 of the type known to experts in the field.

Examples of other types of distribution magazines which could be usefully adapted to the context of this invention are also described in the above-mentioned patent documents U.S. Pat. No. 4,975,234 and U.S. Pat. No. 4,204,823.

Advantageously, the loading apparatus 7 comprises devices 13 for lubricating the annular seal 5. The lubricating devices 13 lubricate an annular seal 5 before it is positioned in the depositing cradle 100 for arming the loader 8 by the pusher 90. With the hopper 11 present, the lubricating devices 13 act, in a portion of the hopper 11 located above the positioner 10, on an annular seal 5 which, arriving from the magazine 12, must be lubricated before being released into the positioner 10 cradle 100.

The following is a description of the lubricating devices 13 in particular with reference to FIGS. 7a, 7b, 19a and 19b (to be considered together with FIGS. 1 to 6 and FIG. 11a).

The lubricating devices 13 comprise a lubricating wheel 130. The lubricating wheel 130 rotates about its own lubricating axis (c) and can move, along the lubricating axis (c), between a position for interference with a portion of the outer edge 51 of an annular seal 5 (FIGS. 3, 4, 5, 6, 7a and 19a), in which it lubricates the outer surface of the seal 5, causing it to rotate by its own rotation about the lubricating axis (c), and a non-interference position (FIGS. 1, 2, 7b and 19b), in which the lubricated annular seal 5 can be placed in the positioner 10.

The lubricating devices 13 comprise a lubricating fluid distributor 132. The fluid distributor 132 is configured for conveying lubricating fluid onto the wheel 130 (for example, by means of a first lubricating tube 132'). The fluid distributor 132 is configured for conveying lubricating fluid onto the inner surface of the annular seal 5 being lubricated (for example, by means of a second lubricating tube 132"). Appropriately, the fluid distributor 132 is configured for conveying lubricating fluid onto the wheel 130 (for example, by means of the first lubricating tube 132') and onto the inner surface of the annular seal 5 being lubricated (for example, by means of the second lubricating tube 132").

The lubricating axis (c) is parallel with the arming axis (a).

With the hopper 11 present, with the lubricating devices 13 active, in a portion of the hopper 11 located above the positioner 10, the wheel 130 can move, along the lubricating axis (c), between the interference position and the non-interference position, through a respective opening 131 made in a front face 114 of the hopper 11. The front face of the hopper 11 corresponds to the flat supporting surface 102 of the cradle 100. The position in which the lubricating wheel 130 interferes with a portion of the outer edge 51 of the annular seal 5 (position for interference with a portion of the outer edge 51 of an annular seal 5) is inside the hopper 11. In its position inside the hopper interfering with a portion of the outer edge 51 of an annular seal 5, the wheel 130, in combination with the walls of the hopper 11, supports the annular seal 5, preventing it from dropping into the positioner 10. The wheel 130 lubricating axis is parallel with the arming axis (a), but (as illustrated for example in the accompanying drawings and, in particular, in FIG. 11a) is shifted laterally relative to the plane defined by the belling axis (b) and by the arming axis (a) when these are parallel with each other (a plane which, as already indicated, if vertical, is the vertical feed plane (pva) of the belling machine 1). In FIG. 11a, D is the distance between the lubricating axis (c) and the vertical feed plane (pva), the latter being shown by the line T which is a projection of the lubricating axis (c) in the vertical feed plane (pva) and by the arming axis (a) itself (which, in turn, is parallel with the line T). The vertical feed plane (pva) is also shown in FIG. 11a by means of the plane of the axial section of the pusher 90 which, in the embodiment shown by way of example in the Figure, coincides with the vertical feed plane (pva).

Figure 19A:
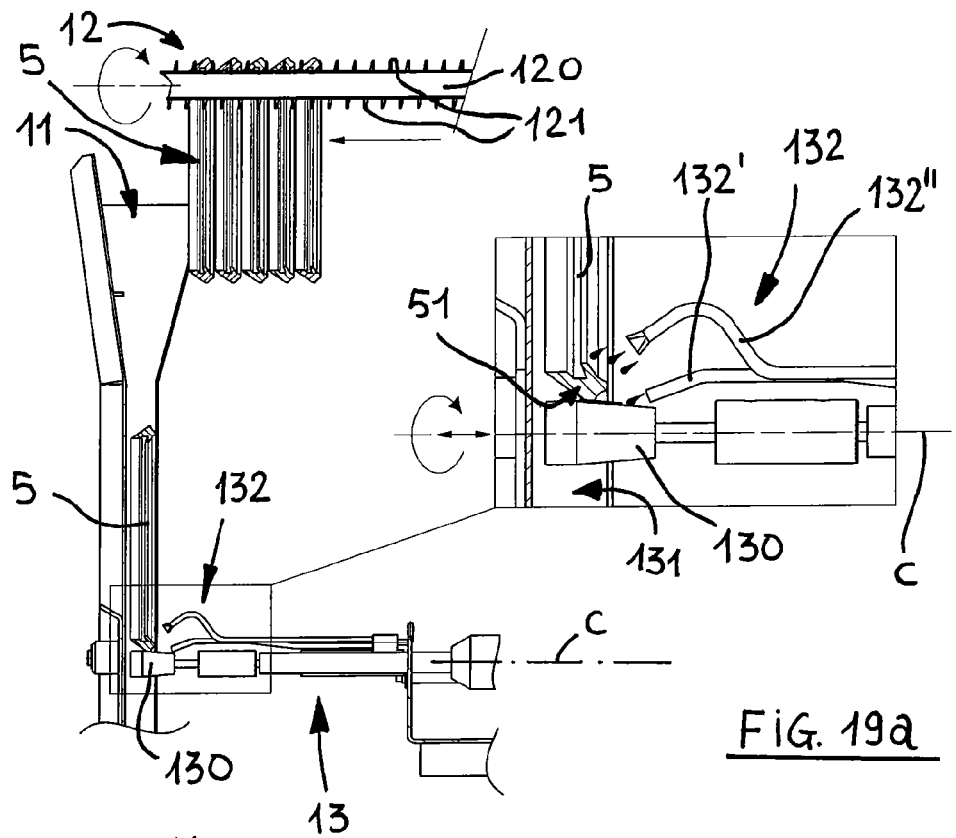
FIGS. 19a and 19b illustrate operation of the seal lubricating devices, showing the operation of the lubricating wheel.
Figure 19B:
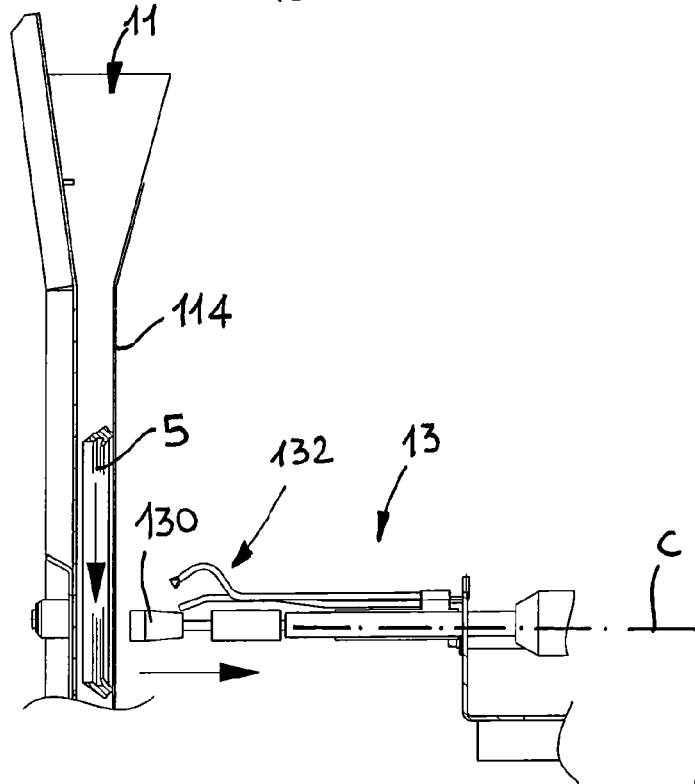

Therefore, the annular seal 5, before reaching the positioner 10 (if the hopper 11 is present, before reaching the lower part of the hopper 11, in which the depositing cradle 100 is located) and being located by the arming device 9 in the loader 8, is lubricated both on its inner surface and its outer surface. With reference to FIGS. 11a, 19a and 19b, with the hopper 11 present the lubricating devices 13 are located at the upper part of the hopper 11. Lubrication is performed on each seal (arriving, from example, from the seal 5 magazine 12). At least in the case in which the belling axis (b) and the arming axis (a) are parallel and in the same vertical plane (the vertical feed plane (pva)), the lubricating wheel 130 has at least a dual function: it stops the seal 5 (received, for example, from the magazine 12) at the lubricating zone (for example in the upper part of the hopper 11, at the height of the opening 131); it lubricates the outer surface of the seal 5 by direct contact and transfer of lubricating fluid (previously adopted on the surface of the wheel, for example from the fluid distributor 132) between the surface of the wheel 130, which rotates rapidly about its own axis (lubricating axis (c)), and the outer surface of the seal 5 being lubricated. The lubricating wheel 130 also has the function of making lubrication of the outer surface of the seal 5 uniform, after rotation of the seal 5 caused by its contact with the wheel 130. If, during said rotation, the lubricating fluid distributor 132 also feeds lubricant onto the inner surface of the seal 5 (for example by means of the second lubricating tube 132"), the lubricating wheel 130, after the rotation it causes on the seal 5, also makes lubrication of the inner surface of the seal 5 uniform. The axial movement of the wheel along the lubricating axis (c) (between the interference position and the non-interference position) and its rotation motion about said axis are achieved thanks to respective actuator and/or motor means, schematically illustrated in the accompanying drawings.

Use of the pusher 90 and its configuration in the arming step are significant for reliability and repeatability of the belling machine 1 operating cycle.

Seal lubrication can significantly improve belling cycle reliability. Of particular importance is the presence of lubricant on the inner surface of the seal 5 (intended to make contact with the outer surface of the cylindrical part 91 of the pusher 90 and with the outer surface of the forming mandrel 4), which allows lubricant adhesion to the outer surface of the forming mandrel 4, during the step of loading the seal 5 on the mandrel 4, thus facilitating the subsequent ascent of the end 30 of the pipe 3 being formed on the mandrel 4 and on the seal 5 which is in position on the mandrel 4. The pusher 90 may be lubricated indirectly (by loading a lubricated seal 5 on the cylindrical part 91 of the pusher), or directly (by means of lubricating fluid distribution tubes). During the arming step, the cylindrical part 91 of the pusher 90 uniformly distributes the lubricant on the inner surface of the seal 5.

The seals used in the "Rieber" system are deformable elements and the use of seals that are not perfectly circular or locally deformed cannot be ruled out. Such seals, once correctly loaded on the forming mandrel 4 adopt the correct shape, meaning that the socket formed is in any case suitable, however, they may make the process of loading the seal on the mandrel quite critical. This critical element is avoided by this invention thanks to the presence of the arming device 9 pusher 90 and its particular interaction with the loader 8 according to this invention, which, thanks to their structure and operation, already restore the correct annular seal 5 shape at the step of arming the loader 8 with a seal. In particular, an important contribution to this result is provided on one hand by the combined action of the pusher 90 and the supporting elements 105 in the positioner 10 (where the supporting elements 105, making contact with the seal 5, promote correct fitting of the seal 5 on the cylindrical part 91 of the pusher 9) and, on the other hand, by the combined action of the pusher 90, the gripper elements 83 and the annular loading flange 80 of the loader 8 in the step of arming the loader 8 with the seal performed by the pusher 90.

Figure 18D:
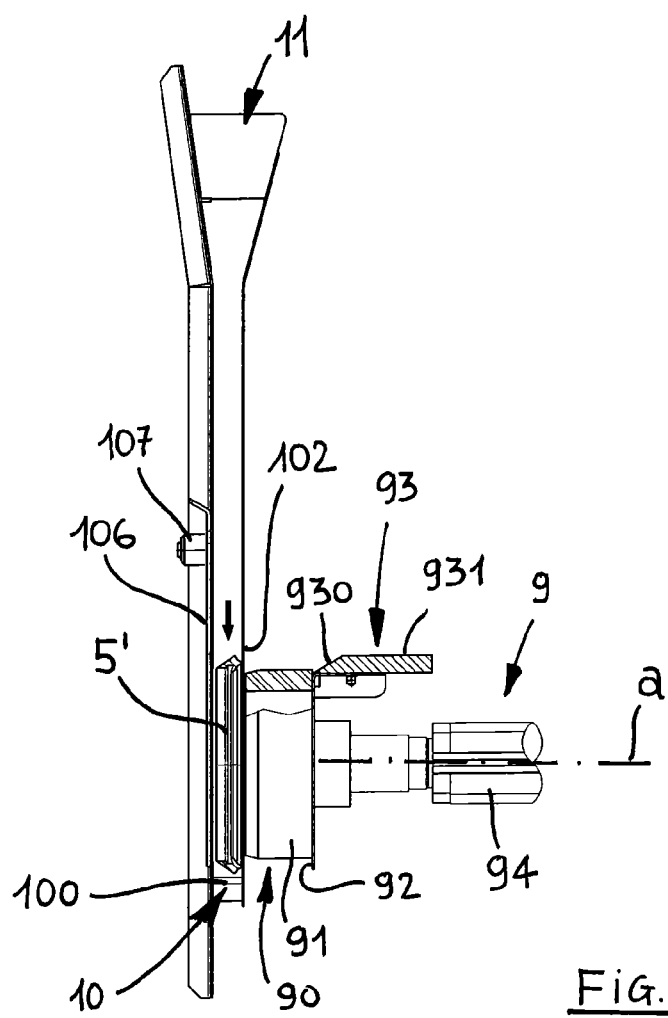

Although in this context of great reliability and precision guaranteed by the solution provided by the invention, to limit as far as possible the problems linked to the use of annular seals 5 which are originally deformed, in the belling machine 1 according to the invention devices are adopted (including the magazine 12, if present) which manage the seals individually. Despite these devices, at times the anomalous condition may arise in which the distribution magazine 12 unloads into the hopper 11 two annular seals 5 one immediately after the other. The consequence of this anomaly (that is to say, one seal 5 correctly positioned in the cradle 100, with a second seal 5 resting over it or partly superposed on it) is shown in FIG. 18a. To overcome this unlikely disadvantage, as shown in FIGS. 9a, 9b, 10a to 10c, 11a, 18b, 18c and 18d but in particular in FIGS. 18b, 18c and 18d, advantageously and preferably the pusher 90 is shaped in such a way that it can separate the seals, guaranteeing correct completion of the arming cycle. Specifically, the pusher 90 comprises on the cylindrical part 91 an upper projection 93, extending along the axis of the pusher 90 away from the second limit position of the pusher 90 from the plane formed by the flat contact portions 92 and comprising, one after the other in that direction, an initial wedge-shaped portion 930 and a subsequent flat portion 931. The upper projection 93 is intended to separate the annular seal 5 which is correctly positioned in the positioner 10 from any additional annular seal 5' which erroneously dropped into the hopper 11 from the magazine 12 and is resting over, or partly superposed on the annular seal 5 which is correctly positioned in the positioner 10, and prevents the pusher 90 from drawing the second seal towards the loader 8 with the annular seal 5 which is correctly positioned in the positioner 10. With reference to FIGS. 18b, 18c and 18d, the following is a description of operating management of the anomaly illustrated in FIG. 18a. FIG. 18a shows the hopper 11 with a first seal 5 correctly positioned in the cradle 100 and a second seal 5' resting over or slightly superposed on the first seal 5. FIGS. 18b, 18c and 18d (in particular the detail box of FIG. 18b) show how, as the pusher 90 advances along the arming axis (a) to load a seal and move it to the loader 8 so as to arm the latter with the seal, the initial wedge-shaped portion 930 of the projection 93, suitably located in the upper part of the pusher 90, is interposed between the two seals 5, 5' and separates them. In this way, the first seal 5 is correctly fitted on the cylindrical part 91 of the pusher 90, whilst the subsequent flat portion 931 of the projection 93 supports the second seal 5' and holds it in the hopper 11. Finally, as FIG. 18d shows, pusher 90 backward movement along the arming axis (a) after arming the loader 8 causes the second seal 5' to drop into the cradle 100 in the correct position for starting another arming cycle.

Preferably, the whole loading apparatus 7 is integral with a carriage 14 able to move parallel with the belling axis (b) independently of the mandrel 4. The movement of the carriage 14 along the belling axis (b) is achieved by means of a respective actuator 140. The carriage 14 is supported by the structure of the belling machine 1.

The belling machine 1 comprises a forming chamber 15 which can be pressurised, coaxial with the belling axis (b). One end 150 of the forming chamber 15 proximal to the means 2 for locking the pipe 3 along the belling axis b, comprises an elastic wall 151 in which there is an opening for inserting the end 30 of the pipe 3 in a sealed fashion. The forming chamber 15 also comprises, at an end 152 distal from the pipe 3 locking means 30, an inlet for the mandrel 4. The forming chamber 15 can move along the belling axis (b) between a first position (illustrated in FIGS. 1, 2, 4, 5 and 6) corresponding to the position in which the mandrel 4 is forward, inserted in the end 30 of the pipe 3, in which its proximal end 150 makes frontal sealed contact with clamps 20 belonging to the locking means 2, encompassing the end 30 of the pipe 3 by means of the opening in the elastic wall 151, and a second position (illustrated in FIG. 3) in which it disengages from the end 30 of the pipe 3 which, when the mandrel 4 has also moved back to the position in which it is disengaged from the pipe 3, allows loading of a pipe 3 to be formed or unloading of a formed pipe 3 from the belling position (FIG. 3a).

The forming chamber 15, the mandrel 4, the contact flange 60 have an axis of symmetry coinciding with the belling axis (b). As already indicated, the belling axis (b), which coincides with the longitudinal axis of the pipe 3 in the operating position, defines the direction of movement (forward-back) of the three devices. The forming chamber 15 is supported by a respective carriage able to move independently of the carriage 43 supporting the mandrel 4, driven by a respective actuator. The forming chamber 15 is preferably supported by the same carriage 14 which supports the entire loading apparatus 7. The loading apparatus 7 is integral with the forming chamber 15.

The hermetic seal in the forming chamber 15, which allows creation of the external pressure with compressed air, is created by: the metal walls 154 of the forming chamber 15; the elastic wall 151, in which there is a hole through which the end 30 of the pipe 3 enters the forming chamber 15 in a sealed condition for pressurisation (elastic wall 151 for which the forming chamber 15 contact elements applied to the clamps 20 form the rigid surface on which it adheres during the pressurising step); a rear annular wall 155 integral with the seal 5 contact flange 60, comprising a suitable elastic element for a hermetic seal with the inner cylindrical metal wall 154 of the forming chamber.

The carriage 14 able to move parallel with the belling axis (b) independently of the mandrel 4, supporting the loading apparatus 7, is the carriage which allows the forming chamber 15 to move. The loader 8 loading position is in front of the end 152 of the forming chamber 15 distal from the locking means 2. The forming chamber 15 stroke along the belling axis (b) between its first and second positions corresponds to the loader 8 stroke along the belling axis (b) between the loading position and the position for releasing the annular seal 5 onto the cylindrical portion 41 of the mandrel 4 when the mandrel 4 is in the back position, disengaged from the pipe 3.

The following is a brief description of operation of the belling machine 1 according to the invention, describing by way of example the operating cycle of a preferred embodiment of the invention.

The sequence of operating steps is described, starting from the end of belling configuration, shown in FIG. 1.

Figure 3:
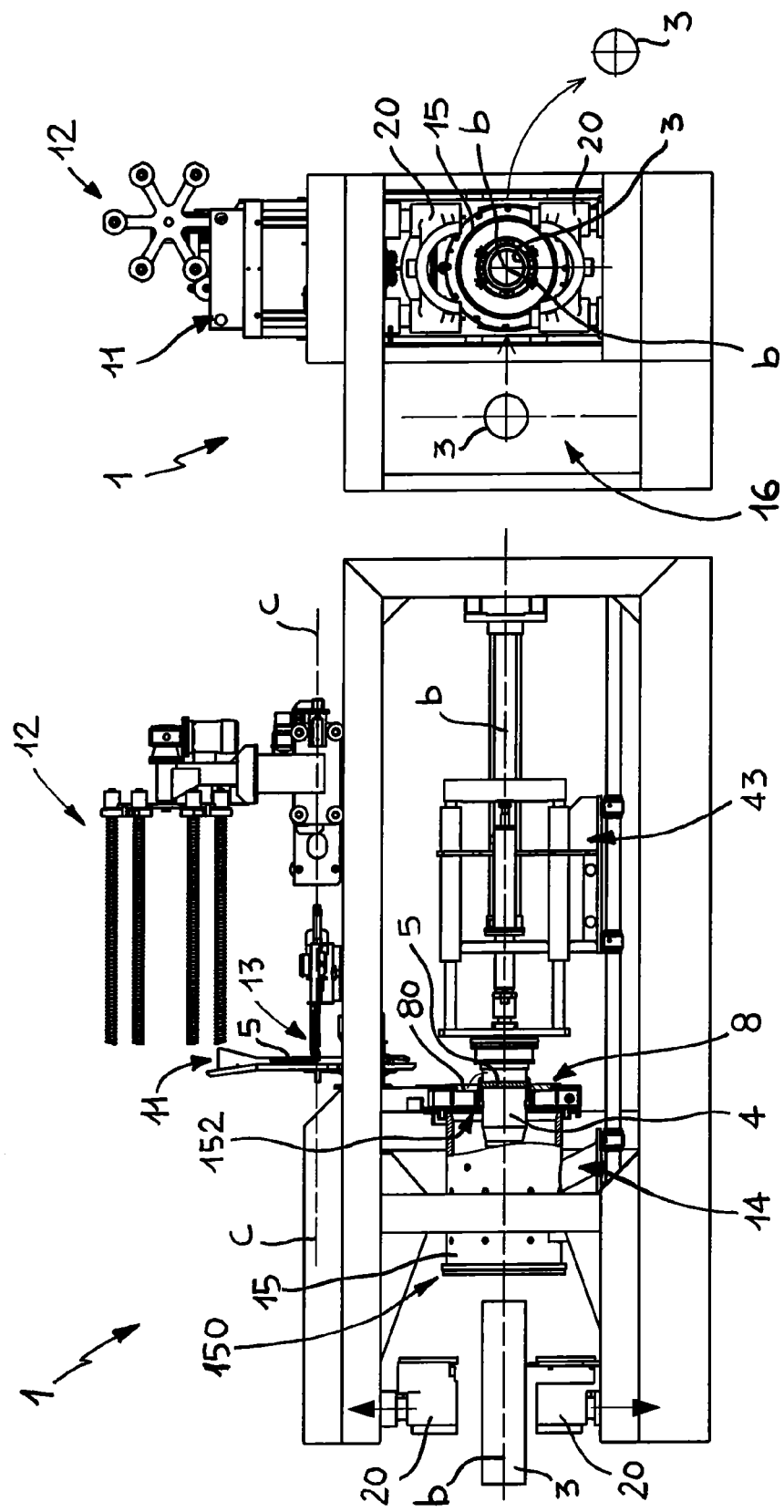
FIG. 3 illustrates the machine of FIG. 2 in which the loader has moved (with the loading apparatus structure and the forming chamber integral with it) onto the mandrel so as to load the seal onto it; it also shows how the pipe is disengaged and the feed hopper is in the appropriate position for receiving a seal from the magazine (and the lubricating wheel is in the forward position for stopping the seal over the positioner and lubricating it)

When the socket cooling step is complete, the mandrel 4 (in particular the carriage 43 supporting the forming mandrel 4 and the contact flange 60) moves back until it stops at the mandrel 4 back position in which the mandrel 4 is ready for an annular seal 5 to be loaded (FIG. 2). This position of the forming mandrel 4 (and therefore the respective carriage 43) is variable depending on the diameter of the pipe 3 being processed and is determined in such a way that the forming mandrel 4 cannot obstruct the movement of the loader 8 from the loading position to the arming position (therefore, where present, the preferably vertical movement of the slide 800 on which the annular loading flange 80 is fixed). This forming mandrel 4 position is such that it allows unloading of the pipe 3 on whose end a socket has been formed and the positioning at the pipe locking means of a new heated pipe 3 (when the forming chamber 15 is present, the pipe 3 on whose end a socket has been formed can be unloaded and a new heated pipe 3 positioned at the locking means when the forming chamber 15 is in its second position). In the embodiment of the invention in which the loading apparatus 7 and the forming chamber 15 are integral with each other, this forming mandrel 4 position is such that unloading of the pipe 3 on whose end a socket has been formed and the positioning at the pipe locking means of a new heated pipe 3 are possible when the forming chamber 15 is in the back position so that the annular loading flange 80 is in the position in which it has loaded the seal 5 on the mandrel 4 (FIGS. 3 and 3a).

With reference in particular to FIG. 2, with the forming mandrel 4 (in particular, with the respective carriage 43) in the back position, disengaged from the pipe 3, described above, the loader 8 (and, therefore, where applicable, the slide 800 with the annular loading flange 80) moves from the position corresponding to the arming axis (a) to that corresponding to the belling axis (b). The movement of the loader 8 to the loading position (therefore, where the slide 800 is present, the preferably lowering movement of the slide 800) causes a new seal to be positioned in the cradle 100. In particular, where the flaps 106 are present, the movement of the loader 8 to the loading position causes the flaps 106 to close. If the belling machine 1 comprises the hopper 11 and the lubricating wheel 130, when the loader 8 reaches the belling axis (b) the wheel 130 moves back along the lubricating axis (c) and the seal 5 in the lubricating position consequently drops to the bottom of the positioner 10 cradle 100. See FIG. 2.

In this step, the forming chamber 15, the annular loading flange 80 and the mandrel 4 are coaxial.

The annular loading flange 80 slides on the mandrel 4 until it has moved the seal 5 to the predetermined position. In particular, the forming chamber 15 carriage 14 (which in the preferred embodiment of the invention coincides with the loading apparatus 7 carriage) moves back until it carries the loader 8 and the seal 5 with it to a predetermined position on the mandrel 4 (FIG. 3). In this step, the mechanisms (gripper elements 83) for gripping the seal 5 on the loader 8 release the seal onto the mandrel 4 as described above. At the moment when the loading flange 80 stops to position the seal 5 (in particular when the forming chamber 15 carriage 14 stops), a new seal 5 is prepared for depositing in the cradle 100. In particular: the magazine 12 feeds the hopper 11 with a new seal 5; the seal is stopped by the lubricating wheel 130 in the lubricating position and the seal 5 lubricating step is started.

When the loader 8 advances on the mandrel 4 to load the seal 5 (in particular, with detachment of the forming chamber 15 from the contact elements of the pipe 3 locking clamps 20), the pipe 3 locking clamps 20 are opened and, when the annular loading flange 80 has stopped in the predetermined position for positioning the seal 5 on the mandrel (in particular: with the forming chamber 15 carriage 14 stopped), a pipe 3 with a heated end 30 is transferred (in particular from a heating station 16) to be formed into the locking clamps 20 zone, with simultaneous unloading of the pipe 3 on which a socket has been formed (FIGS. 3 and 3a).

With the new pipe 3 in position on the belling axis (b), the locking clamps 20 close again.

When the locking clamps 20 close, the loader 8 is withdrawn from the mandrel 4 and returned to the loading position (in particular, if the forming chamber 15 is integral with the loading apparatus 7, the forming chamber 15 carriage 14 advances until it rests on the contact elements of the locking clamps 20). See FIG. 4. At this point (in particular, when the forming chamber 15 is resting against the contact elements of the locking clamps 20), the loader 8 is moved to the arming position (in particular, the slide 800, with the annular loading flange 80, is moved—preferably with a lifting movement in the vertical feed plane (pva)—to the arming axis (a). If the flaps 106 are present, in this configuration the flaps 106 are opened, by the movement means 116).

Figure 4:
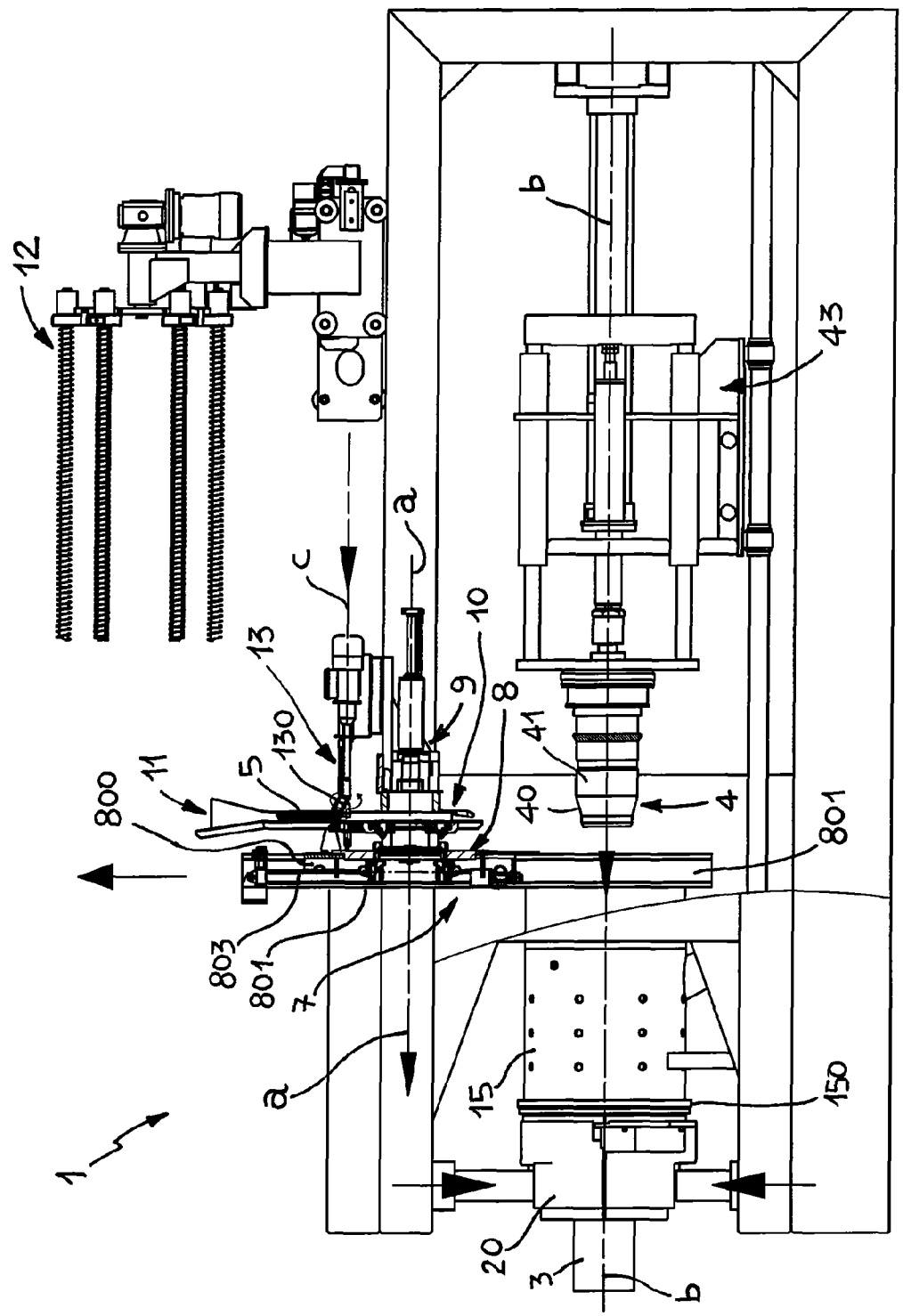
FIG. 4 illustrates the machine of FIG. 3 with the loader brought to the arming position, after being removed from the mandrel and returned, no longer armed and without a seal, to the loading position; the fact that the movement of the loading structure accompanies the return of the forming chamber in contact on the pipe locking clamps is shown.
Figure 5:
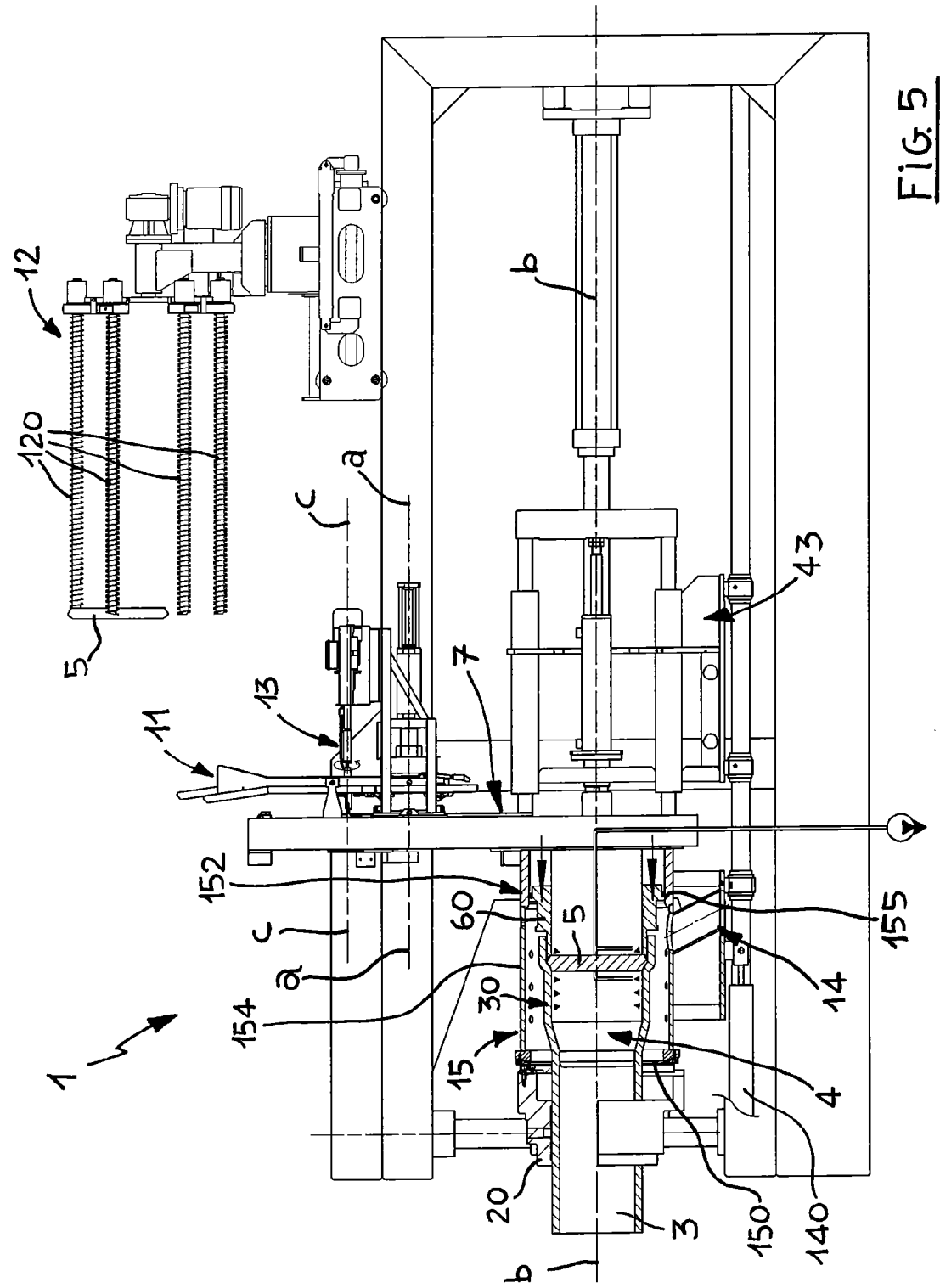
FIG. 5 illustrates the machine of FIG. 4 in the step of advancing the mandrel until the socket is formed (showing the action of the seal contact flange in the forward position on the mandrel)
Figure 6:
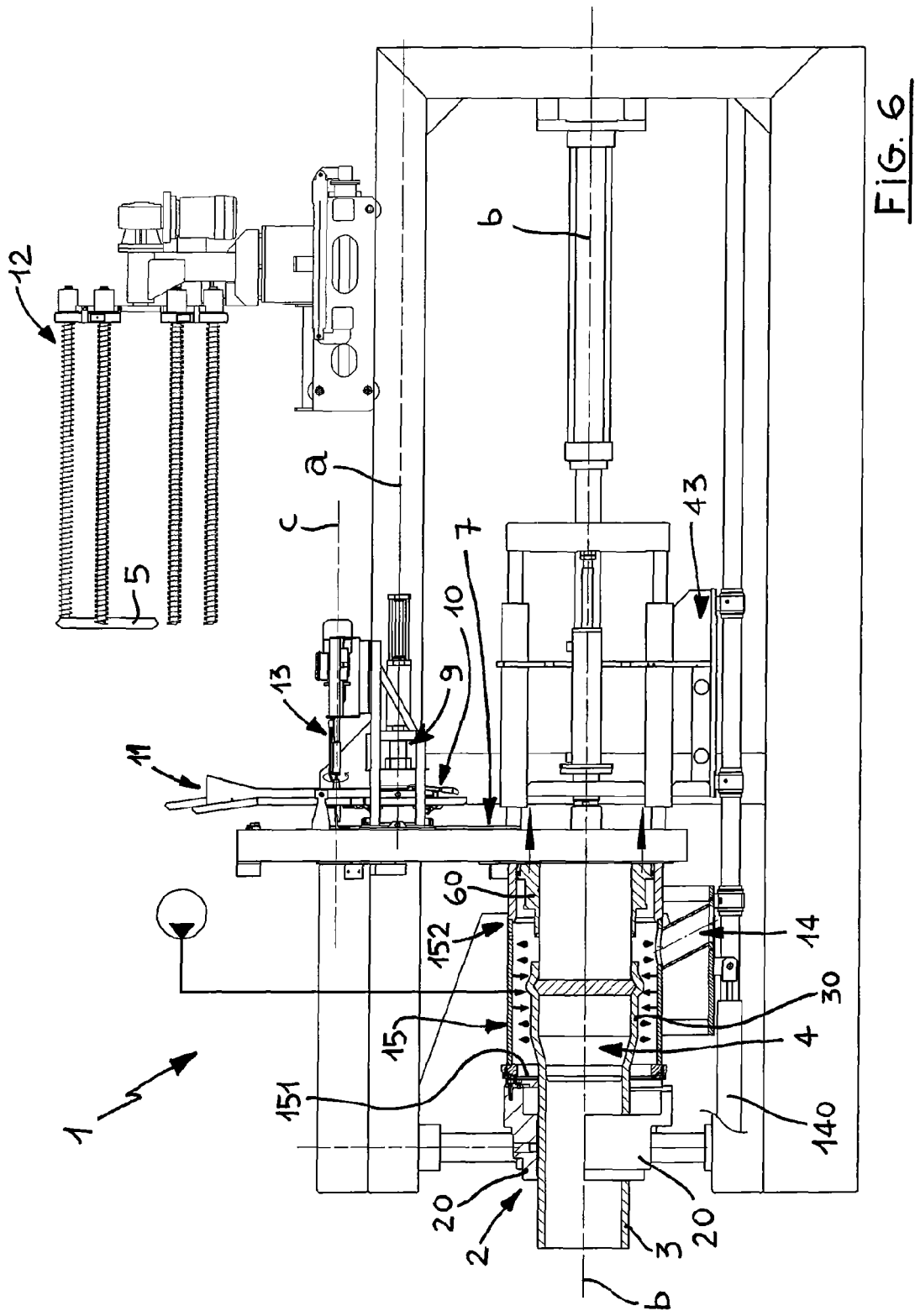
FIG. 6 illustrates the end step of socket forming on the mandrel with the seal contact flange in the back position. In this Figure the machine is in the step preceding that of FIG. 1 (with the lubricating wheel still forward in the lubricating position)

When the loader 8 has been moved to the arming axis (a) (in particular, when slide 800 lifting is complete), the mandrel 4 (in particular with the respective carriage 43) advances until, with the seal 5 loaded, it is at the belling position (FIGS. 4 and 5). Where required, simultaneously, the contact flange 60 advances, relative to the mandrel 4, resting against the seal 5 and definitively positioning the seal 5 on the mandrel 4 to hold it in position during mandrel 4 insertion in the end 30 of the pipe 3 (FIGS. 4 and 5). At this point the mandrel 4 is inserted in the end 30 of the pipe 3. If the forming chamber 15 is present, the mandrel 4 has also penetrated the forming chamber 15 in a sealed fashion. In this case, in particular, with the mandrel 4 (and therefore with the respective forming carriage 43) forward, the forming chamber 15 hermetic seal is created. As shown in FIG. 6, at this point forming is carried out with external pressure and/or an internal vacuum in the socket, followed by socket cooling (with suitable—preferably subject to—backward movement of the contact flange 60 if, as shown in FIG. 6, the belling machine 1 also comprises the contact flange 60).

During the socket forming and cooling step, seal 5 management and arming operations are carried out. In particular: the annular loading flange 80 is armed with the seal 5 present in the collection cradle 100; where required, rotation and lubrication of the seal 5 resting on the lubricating wheel 130 continues.

The invention brings important advantages.

First, it allows the seal to be loaded on the mandrel with a high level of precision and extremely low level of errors.

Second, the apparatus for loading the seal on the socket forming mandrel of the belling machine according to the invention and the construction solutions linked to it allow the operations for loading the seal on the forming mandrel to be carried out with minimum effect on the duration of the socket forming cycle. The system described may advantageously be used for modifying and adding to a machine layout of the type described in patent document EP 0 684 124 maintaining, even with socket forming according to the "Rieber" system, socket forming with external pressure and those advantages in terms of production speed, the possibility of processing short pipes and reliability which this machine layout already allows with external pressure and mechanical plug processing operations that do not use the "Rieber" system.

The invention provides an apparatus whose features make it suitable for processing pipes of all sizes requiring socket forming on the end in normal extrusion line configurations.

The invention claimed is:

1. A belling machine (1) for pipes made of thermoplastic material, forming end sockets equipped with an integrated seal, comprising:

a locking assembly (2) configured for locking a pipe (3) made of thermoplastic material for keeping the pipe (3) coaxial with a belling machine (1) belling axis (b) and in the belling position;

a forming mandrel (4) which can be forcibly inserted in a heated end (30) of the pipe (3) for forming the end into a socket, for that purpose the mandrel being able to move along the belling axis (b) and coaxial with it, between a back position in which it is disengaged from the pipe (3) and a forward position in which it is inserted in the end (30) of the pipe (3), the mandrel (4) comprising a tapered portion (40), its diameter increasing along the axis of the mandrel (4) away from the forward insertion position towards the rear disengaged position, followed, in that direction, by a cylindrical portion (41) whose diameter is equal to the maximum diameter of the tapered portion (40); there being the possibility of placing on the cylindrical portion (41) of the (4) mandrel, diametrically expanded, coaxially and in a predetermined position, an annular seal (5) to be integrated in the end (30) of the pipe (3) which has a socket formed on it;

an annular seal constraining assembly (6), configured for holding the seal (5) in the predetermined position on the cylindrical portion (41) at least during insertion of the forming mandrel (4) in the end (30) of the pipe (3);

a loading apparatus (7), configured for loading the annular seal (5) on the forming mandrel (4);

the loading apparatus (7) comprises: a loader (8) for loading the annular seal (5) on the mandrel (4), the loader being able to move between a arming position, in which the loader (8) is spaced from the belling axis (b) and does not interfere with the mandrel (4) movement along the belling axis (b), and a loading position, in which the loader (8) is coaxial with the belling axis (b) and is located between the mandrel (4) back position, disengaged from the pipe (3), and the mandrel (4) forward position, inserted in the end (30) of the pipe (3); an arming device (9) which armes the loader (8) with the annular seal (5) when the loader (8) is in the arming position; an annular seal (5) positioner (10) in which the annular seal (5) is placed in an operating position for the action of the arming device (9);

the loader (8) comprises: an annular loading flange (80), designed so that the edge (81) of its inner circular opening (82), having a diameter greater than the diameter of the cylindrical portion (41) of the mandrel (4), makes contact with a front circumferential portion (50) of an outer edge (51) of the annular seal (5); a plurality of gripper elements (83), each gripper element (83) each rotatably constrained to the structure of the annular loading flange (80) at a respective pivot (830) and free to rotate there about a respective axis parallel with a plane in which the annular loading flange (80) lies, between a closed position, in which one end (831) of the gripper element (83) distal from the pivot (830) presses on a rear circumferential portion (52) of the outer edge (51) of the annular seal (5), holding it against the edge (81) of the inner circular opening (82) of the annular loading flange (80), and an open position, in which said distal end (831) is spaced from the rear circumferential portion (52) of the outer edge (51) of the annular seal (5), leaving the seal (5) free to detach from the edge (81) of the inner circular opening (82) of the annular loading flange (80), the movement of the distal end (831) of each gripper element (83) from the closed position towards an open position being opposed by an the action of elastic return elements (84), the gripper elements (83) being distributed along the edge (81) of the inner circular opening (82) of the annular loading flange (80) in such a way as to form the gripper device acting in a self-centring way on the annular seal (5) towards the edge (81) of the inner circular opening (82) of the annular loading flange (80);

the shape of the distal end (831) of each gripper element (83) and the respective position, with the distal end (831) in the closed position, adopted by the pivot (830) of each gripper element (83) and the respective distal end (831), being such that a thrust applied on a lower front portion (832) of the distal end (831) towards the annular loading flange (80) along the axis of the inner circular opening (82) of the annular loading flange (80) produces a movement of the distal end (831) towards the respective open position;

the loader (8) also comprising means (85) for mechanical interference with the surface of the mandrel (4), the means being operatively connected to the gripper elements (83);

when the loader (8) is in the loading position, with the mandrel (4) in the back position, disengaged from the pipe (3), the inner circular opening (82) of the annular flange (80) is coaxial with the belling axis (b) and keeps a rear face (53) of the annular seal (5) facing towards the mandrel (4), the rear circumferential portion (52) of the outer edge (51) of the seal (5) belonging to said rear face;

from the loading position, with the mandrel (4) in the back position, disengaged from the pipe (3), the loader (8) can move relative to the mandrel (4) along the belling axis (b) at least as far as a position for releasing the annular seal (5) onto the cylindrical portion (41) of the mandrel (4), coinciding with the predetermined position of the annular seal (5) on the cylindrical portion (41) of the mandrel (4), through a series of intermediate positions in which the inner circular opening (82) of the annular flange (80) is fitted on the mandrel (4) and passes along its tapered portion (40) and its cylindrical portion (41), conveying the annular seal (5) with it and causing the seal to expand diametrically along the tapered portion (40) of the mandrel (4); on at least an end part of the tapered portion (40) and during the passage onto the cylindrical portion (41) the loader (8) means (85) for mechanical interference with the surface of the mandrel (4) interfere with the lateral surface of the mandrel (4), which acts as a mechanical cam, and they cause the gradual movement of the distal end (831) of each gripper element (83) from the closed position towards the open position, leaving the rear face (53) of the annular seal (5) free;

from the position where it releases the annular seal (5) on the cylindrical portion (41) of the mandrel (4), the loader (8) can move relative to the mandrel (4) along the belling axis (b) with a return movement towards the loading position, the gripper elements (83) remaining in the open position at least for an initial stretch of that return movement due to the action of the means (85) for mechanical interference, and allowing annular seal (5) release and consequent positioning in the predetermined position on the cylindrical portion (41) of the mandrel (4);

the arming device (9) comprises a pusher (90), coaxial with a belling machine (1) arming axis (a) and able to move along the arming axis (a) between a first limit position for disengagement from the positioner (10) and a second limit position for arming the loader (8) with the annular seal (5), the annular seal (5) positioner (10) being located on the arming axis (a) between the loader (8) arming position and the first limit position for pusher (90) disengagement;

the pusher (90) comprises: a cylindrical part (91), with a diameter less than the diameter of the cylindrical portion (41) of the mandrel (4) and such that it does not interfere with the means (85) for mechanical interference with the mandrel (4) when inserted in the inner circular opening (82) of the annular loading flange (80) coaxially with the latter, the cylindrical part (91) of the pusher (90) being intended to be inserted in the annular seal (5) without causing seal diametrical expansion and to support the seal (5) during the arming movement until the seal (5) is released in the loader (8); flat contact portions (92) lying in a plane which is perpendicular to the arming axis (a), said flat contact portions (92) projecting outside the cylindrical part (91) of the pusher (90) and intended to make contact with the rear face (53) of the annular seal (5);

the positioner (10) comprises a depositing cradle (100) for an annular seal (5) which is limited: at the bottom by a semi-circular supporting surface (101) whose concavity is facing towards the arming axis (a) and intended to support the annular seal (5) with a circumferential part (50, 52) of a portion of the outer edge (51) of the seal (5) resting on it; at the front, towards the pusher (90) first limit position, by a flat supporting surface (102) which is perpendicular to the arming axis (a), comprising an opening (103) for the passage of the pusher (90), the rear face (53) of the annular seal (5) and/or the rear circumferential portion (52) of the outer edge (51) of the annular seal (5) being intended to rest on an edge (104) of the opening; for the opening for the passage of the pusher (90); at the back, towards the loader (8) arming position, by annular seal (5) supporting elements (105) on which a front face (54) of the annular seal (5) and/or the front circumferential portion (50) of the outer edge (51) of the annular seal (5) is intended to rest;

the positioner (10) supporting elements (105) being able to move between a first configuration, close to the arming axis (a), for supporting and guiding the front face (54) of the annular seal (5) and/or the front circumferential portion (50) of the outer edge (51) of the annular seal (5), and a second configuration, spaced from the arming axis (a) and in which the pusher (90) and the annular seal (5), loaded on the cylindrical part (91) of the pusher (90) and making contact with the respective flat contact portions (92), are free to pass through the positioner (10) and to reach the loader (8) located in the arming position, a passage from the first to the second configuration of at least part of the supporting elements (105) being caused by the thrust from the seal (5) due to the contact between the seal (5) and the flat contact portions (92);

when the loader (8) is in the arming position, the inner circular opening (82) of the annular flange (80) is coaxial with the belling machine (1) arming axis (a) and the distal ends (831) of the gripper elements (83) remain facing towards the positioner (10), the distal ends (831) being in the closed position when there is no annular seal (5) in the loader (8);

in the movement from the first to the second limit position, the pusher (90) passes through a series of intermediate positions one after another, in which: the pusher (90) reaches the opening (103) in the cradle (100) flat supporting surface (102), penetrates it and, with the contact offered by at least part of the positioner (10) supporting elements (105) which have not yet been moved to the second configuration, the pusher is inserted in the annular seal (5) positioned in the cradle (100) and carries the seal on its cylindrical part (91), sliding inside the seal until the rear face (53) of the annular seal (5) makes contact with the pusher (90) flat contact portions (92); when the rear face (53) of the annular seal (5) makes contact with the flat contact portions (92) of the pusher (90), the thrust that the annular seal (5) consequently applies causes said at least part of the positioner (10) supporting elements (105) to pass from the first to the second configuration and the possibility for the pusher (90), with the annular seal (5) loaded on the cylindrical part (91), to pass through the positioner (10) and reach the loader (8) in the arming position; the front circumferential portion (50) of the outer edge (51) of the annular seal (5) making contact with the lower front portion (832) of the distal end (831) of the gripper elements (83) and applying on it, due to the action of the pusher (90) flat contact portions (92), a thrust towards the annular loading flange (80) along the axis of the circular opening (82) which produces the movement of the distal end (831) towards the respective open position; the further movement of the pusher (90) causing the annular seal (5) to pass beyond the distal end (831) and, due to the action of the elastic return means (84), reclosing of the distal end (831) on the rear circumferential portion (52) of the outer edge (51) of the annular seal (5) and consequent contact between the latter and the edge (81) of the inner circular opening (82) of the annular loading flange (80), the pusher (90) having thus reached the second limit position for arming the loader (8) with the annular seal (5);

from the second limit position for arming the loader (8) with the annular seal (5), the pusher (90) being able to move relative to the loader (8) along the arming axis (a) with a return movement towards the first limit position for disengagement from the positioner (10), the annular seal (5) remaining retained by the gripper elements (83) in the loader (8) and leaving the pusher (90) free.

2. The belling machine according to claim 1, wherein in the loader (8):

the edge (81) of the inner circular opening (82) of the annular loading flange (80) comprises, in the zone which makes contact with the front circumferential portion (50) of the edge of the annular seal (5), a tapered guide (810);

the distal end (831) of each of the gripper elements (83) has two angled flat surfaces, together forming a dihedron whose rounded edge is facing towards the axis of the inner circular opening (82) and each corresponding, respectively, to the lower front portion (832) and to an adjacent lower rear portion (833) of the distal end (831).

3. The belling machine according to claim 1, wherein in the loader (8):

the respective pivots (830) of the gripper elements (83) are constrained to the loader (8) on the side of the annular loading flange (80) opposite that with which the annular seal (5) makes contact, the gripper elements (83) passing through the annular flange (80) in special respective through-slots (86) which allow them to rotate about the pivot (830) between the closed position and the open position, in such a way that the ends (831) distal from the pivots are kept on the side of the annular loading flange (80) with which the annular seal (5) makes contact;

the pivots (830) of the gripper elements (83) define a pivoting plane (830') and the ends (831) of the gripper elements (83) distal from the pivots define a gripping plane (831'), both of said planes being parallel with the annular loading flange (80) and positioned on opposite sides of the latter.

4. The belling machine according to claim 3, wherein the through-slots (86) surround the gripper elements (83) on four sides.

5. The belling machine according to claim 3, wherein:

the means (85) for mechanical interference with the surface of the mandrel (4) comprise, on each gripper element (83), a corresponding shaped projection (850), located between the pivot (830) and the distal end (831) of the gripper element (83) and pointing towards the axis of the inner circular opening (82) of the annular loading flange (80), the shaped projection (850) having a predetermined length designed to allow, when the annular loading flange (80) is fitted on the mandrel (4), interference of the shaped projection (850) at least with an end part of the tapered portion (40) of the mandrel and with the subsequent cylindrical part (41) of the mandrel (4);

the ends of the shaped projections (850) defining a respective interference plane (851') which is parallel with the pivoting plane (830') and the gripping plane (831') and lies between them.

6. The belling machine according to claim 3, wherein the elastic return elements (84) which return the distal ends (831) of the gripper elements (83) to the closed position comprise an elastic ring (840) circumferentially wrapped around the gripper elements (83) on the outside of the latter, and placed between the pivots (830) and the distal ends (831).

7. The belling machine according to claim 1, wherein in the positioner (10) the annular seal (5) supporting elements (105) comprise:

flat elements in the form of mobile flaps (106), each rotating at a respective pivot (107) about a respective axis parallel with the arming axis (a) between a first and a second limit condition, respectively corresponding, in the case of the flaps (106), to the first and the second configurations of the supporting elements (105), the flaps (106) comprising stretches (108) positioned at the sides of the arming axis (a), the flaps (106) being in the first configuration when the loader (8) is not in the arming position and, due to the action of respective movement means, moving from the first to the second configuration when the loader (8) moves from the loading position to the arming position and, vice versa, the flaps moving from the second to the first configuration when the loader (8) moves from the arming position to the loading position;

supports (109) distributed about the arming axis (a) in the stretches not covered by the flaps (106), in positions which do not interfere with the flat portions (92) of the pusher (90) when the latter passes through the positioner (10);

the supports (109) being intended to support the annular seal (5) at the moment when the flaps (106) move to the second configuration;

the supports (109) forming the at least one part of the supporting elements (105) whose passage from the first to the second configuration is caused by the thrust from the annular seal (5) due to the contact between the seal (5) and the flat contact portions (92) of the pusher (90) as the pusher (90) passes through the positioner (10);

the movement of the supports (109) between the first and second configurations being a rotation about axes of rotation which are parallel with the plane of the flat supporting surface (102) at respective pivots (110) under the opposing action of respective elastic opposing means (111) which tend to keep the supports (109) in the first configuration;

the supports (109) being distributed around the arming axis (a) in such a way as to form a self-centring supporting system for the annular seal (5).

8. The belling machine according to claim 7, wherein the elastic opposing means (111) comprise a single elastic element (118) closed in a loop and simultaneously applied on all of the supports (109).

9. The belling machine according to claim 7, wherein:

the annular loading flange (80) is housed on a slide (800) which can move, driven by the action of respective movement means (803), along respective guides (801) between two limit positions corresponding to the loader (8) loading and arming positions, respectively;

each flap 106 comprises a respective projection (112) intended to interact with a respective cam (802) integral with the slide (800);

when the slide (800) moves from the limit position corresponding to the loader (8) loading position to the limit position corresponding to the loader (8) arming position, each cam (802) acts on the respective projection (112) of a flap (106), causing the flap (106) to open and remain in the second configuration for as long as the loader (8) is in the arming position;

when the slide (800) moves from the limit position corresponding to the loader (8) arming position to the limit position corresponding to the loader (8) loading position, each cam (802) stops acting on the respective projection (112) of a flap (106) and the action of the flap (106) elastic return means (113) causes the flaps to close and be kept in the first configuration for as long as the loader (8) is in the loading position;

the cams (802), the projections (112) and the flap (106) elastic return means (113) being part of the flap (106) movement means.

10. The belling machine according to claim 1, wherein the belling axis (b) and the arming axis (a) are parallel with each other and belong to the same vertical feed plane (pva), with the arming axis (a) located above the belling axis (b), the positioner (10) being made in the lower part of an annular seal (5) feed hopper (11), which receives the annular seal (5) which is dropped from a distribution magazine (12) and conveys it to the positioner (10).

11. The belling machine according to claim 10, wherein the pusher (90) comprises on the cylindrical part (91) an upper projection (93), extending along the axis of the pusher (90) away from the second limit position of the pusher (90) from the plane formed by the flat contact portions (92) and comprising, one after the other in that direction, an initial wedge-shaped portion (930) and a subsequent flat portion (931), the upper projection (93) being intended to separate the annular seal (5) which is correctly positioned in the positioner (10) from any additional annular seal (5') which erroneously dropped into the hopper (11) from the magazine (12) and is resting over, or partly superposed on the annular seal (5) which is correctly positioned in the positioner (10) and to prevent the pusher (90) from drawing the second seal towards the loader (8) with the annular seal (5) which is correctly positioned in the positioner (10).

12. The belling machine according to claim 10, wherein the loading apparatus (7) comprises devices (13) for lubricating the annular seals (5), the devices acting, in a portion of the hopper (11) located above the positioner (10), on an annular seal (5) which, arriving from the magazine (12), must be lubricated before being released into the positioner (10) cradle (100).

13. The belling machine according to claim 12, wherein the lubricating devices (13) comprise:
   a lubricating wheel (130), rotating about its own lubricating axis (c) and able to move, along the lubricating axis (c) and through a respective opening (131) made in a front face (114) of the hopper (11), between a position inside the hopper for interference with a portion of the outer edge (51) of the annular seal (5), in which, in combination with the walls of the hopper (11) it supports the annular seal (5), preventing it from dropping into the positioner (10) and lubricating the outer surface of the seal (5), making the seal rotate due to its own rotation about the lubricating axis (c), and a non-interference position, outside the hopper (11), in which the annular seal (5) is left free to drop into the positioner (10);
   a lubricating fluid distributor (132) configured for conveying lubricating fluid onto the wheel (130) and onto the inner surface of the annular seal (5) being lubricated.

14. The machine according to claim 1, wherein the whole loading apparatus (7) is integral with a carriage (14) able to move parallel with the belling axis (b) independently of the mandrel (4).

15. The machine according to claim 1, wherein the machine comprises a forming chamber (15) which can be pressurised, coaxial with the belling axis (b), one end (150) of the forming chamber proximal to the locking assembly (2) for locking the pipe (3) along the belling axis (b) comprising an elastic wall (151) in which there is an opening for inserting the end (30) of the pipe (3) in a sealed fashion and, at an end (152) distal from the pipe (3) locking assembly (2), comprising an inlet for the mandrel (4), the forming chamber (15) being able to move along the belling axis (b) between a first position, corresponding to the position in which the mandrel (4) is forward, inserted in the end (30) of the pipe (3), in which its proximal end (150) makes frontal sealed contact with clamps (20) belonging to the locking assembly (2), encompassing the end (30) of the pipe (3) by means of the opening in the elastic wall (151), and a second position in which it disengages from the end (30) of the pipe (3) which, when the mandrel (4) has also moved back to the position in which it is disengaged from the pipe (3), allows loading of a pipe (3) to be formed or unloading of a formed pipe (3) from the belling position.

16. The belling machine according to claim 15, wherein:
   the whole loading apparatus (7) is integral with a carriage (14) able to move parallel with the belling axis (b) independently of the mandrel (4);
   the carriage (14) able to move parallel with the belling axis (b) independently of the mandrel (4) which supports the loading apparatus (7) is the carriage which allows the forming chamber (15) to move, the loader (8) loading position being in front of the end (152) of the forming chamber (15) distal from the locking assembly (2), the forming chamber (15) stroke along the belling axis (b) between its first and second positions corresponding to the loader (8) stroke along the belling axis (b) between the loading position and the position for releasing the annular seal (5) onto the cylindrical portion (41) of the mandrel (4) when the mandrel (4) is in the back position, disengaged from the pipe (3).

* * * * *

UNITED STATES PATENT AND TRADEMARK OFFICE
CERTIFICATE OF CORRECTION

PATENT NO. : 8,512,027 B2  
APPLICATION NO. : 13/047995  
DATED : August 20, 2013  
INVENTOR(S) : Giorgio Tabanelli Page 1 of 1

It is certified that error appears in the above-identified patent and that said Letters Patent is hereby corrected as shown below:

In the Claims:

In claim 1, in column 24, lines 7 and 8, please delete "each rotatably constrained to the structure" and replace it with -- being rotatably constrained to an inner structure --.

In claim 1, in column 24, line 22, please delete "the movement" and replace it with -- a movement --.

In claim 1, in column 25, lines 55-56, please delete "the opening; for the opening" and replace it with -- said opening --.

Signed and Sealed this  
Twenty-second Day of October, 2013

Teresa Stanek Rea  
*Deputy Director of the United States Patent and Trademark Office*